United States Patent
Sowden et al.

(10) Patent No.: US 10,222,960 B2
(45) Date of Patent: Mar. 5, 2019

(54) ANIMATION OF USER INTERFACE ELEMENTS

(71) Applicant: Google Inc., Mountain View, CA (US)

(72) Inventors: Paul Sowden, Palo Alto, CA (US); Eric Henry, San Francisco, CA (US)

(73) Assignee: Google LLC, Mountain View, CA (US)

( * ) Notice: Subject to any disclaimer, the term of this patent is extended or adjusted under 35 U.S.C. 154(b) by 410 days.

(21) Appl. No.: 15/139,259

(22) Filed: Apr. 26, 2016

(65) Prior Publication Data

US 2017/0308275 A1    Oct. 26, 2017

(51) Int. Cl.
| | | |
|---|---|---|
| G06F 3/0484 | (2013.01) | |
| G06F 3/0482 | (2013.01) | |
| G06T 13/80 | (2011.01) | |
| G06Q 10/00 | (2012.01) | |
| G06F 3/0488 | (2013.01) | |
| G06F 3/0481 | (2013.01) | |

(52) U.S. Cl.
CPC ........ G06F 3/04845 (2013.01); G06F 3/0482 (2013.01); G06F 3/04817 (2013.01); G06F 3/04883 (2013.01); G06Q 10/00 (2013.01); G06T 13/80 (2013.01); *G06T 2200/24* (2013.01)

(58) Field of Classification Search
CPC .................................................. G06F 3/04845
USPC .......................................................... 715/763
See application file for complete search history.

(56) References Cited

U.S. PATENT DOCUMENTS

| | | |
|---|---|---|
| 7,296,242 B2 | 11/2007 | Agata et al. |
| D593,578 S | 6/2009 | Ball et al. |
| D638,432 S | 5/2011 | Flik et al. |
| 8,160,309 B1 | 4/2012 | Tzur et al. |
| D658,673 S | 5/2012 | Velasco et al. |
| D664,550 S | 7/2012 | Lee et al. |
| D664,967 S | 8/2012 | Lee et al. |
| D664,968 S | 8/2012 | Lee et al. |
| D665,395 S | 8/2012 | Lee et al. |

(Continued)

FOREIGN PATENT DOCUMENTS

| | | | |
|---|---|---|---|
| EP | 2793115 | 10/2014 | |
| WO | WO2017189047 | * 11/2017 | ........... G06F 3/0481 |

OTHER PUBLICATIONS

USPTO, First Action Interview, Office Action Summary for U.S. Appl. No. 15/362,725, dated Mar. 19, 2018, 6 pages.

(Continued)

*Primary Examiner* — William D Titcomb

(74) *Attorney, Agent, or Firm* — IP Spring

(57) ABSTRACT

Implementations relate to generating and displaying animations of user interface elements. In some implementations, a computer-executed method includes receiving user input indicative of manipulation of a particular user interface element with respect to a grid including a plurality of user interface elements. The method identifies, based on the user input, at least first and second rows of the grid to be updated. The method generates an animation to update the grid, including an update of the second row of the grid and one or more transitions comprising at least one of: transition of a first user interface element from the first row to outside the display area of the grid along a first direction, and transition of a second user interface element into the first row from outside the display area along a different second direction. The method causes the animation to be displayed.

20 Claims, 10 Drawing Sheets

(56) References Cited

U.S. PATENT DOCUMENTS

| | | | |
|---|---|---|---|
| D673,168 S | 12/2012 | Frijlink et al. | |
| 8,370,282 B1 | 2/2013 | Leung et al. | |
| D687,446 S | 8/2013 | Arnold et al. | |
| D692,448 S | 10/2013 | Jung et al. | |
| D692,456 S | 10/2013 | Brinda et al. | |
| D692,915 S | 11/2013 | Brinda et al. | |
| D695,776 S | 12/2013 | Edwards et al. | |
| D695,780 S | 12/2013 | Edwards et al. | |
| D695,781 S | 12/2013 | Edwards et al. | |
| 8,774,528 B2 | 7/2014 | Hibino et al. | |
| 9,116,648 B1 | 8/2015 | Funderburg et al. | |
| D737,831 S | 9/2015 | Lee | |
| D745,550 S | 12/2015 | Sanderson | |
| 9,269,323 B2 | 2/2016 | Edmiston et al. | |
| D757,058 S | 5/2016 | Kai | |
| D757,085 S | 5/2016 | Zukerman et al. | |
| D762,671 S | 8/2016 | Chan et al. | |
| D763,891 S | 8/2016 | Gomez et al. | |
| D763,900 S | 8/2016 | Jeon et al. | |
| D766,308 S | 9/2016 | Park et al. | |
| D766,928 S | 9/2016 | Webster et al. | |
| D766,968 S | 9/2016 | Gagnier | |
| D766,970 S | 9/2016 | Gagnier | |
| D768,676 S | 10/2016 | Edwards et al. | |
| D768,692 S | 10/2016 | Jahani et al. | |
| D769,306 S | 10/2016 | Bowen et al. | |
| D770,472 S | 11/2016 | Lee et al. | |
| D770,481 S | 11/2016 | Wielgosz | |
| D770,499 S | 11/2016 | Rodriguez | |
| D771,081 S | 11/2016 | Wielgosz | |
| D772,919 S | 11/2016 | Jiang et al. | |
| D774,065 S | 12/2016 | Tanaka | |
| D776,692 S | 1/2017 | Armstrong | |
| D777,752 S | 1/2017 | Heller et al. | |
| D778,310 S | 2/2017 | Roberts et al. | |
| D780,801 S | 3/2017 | Jann et al. | |
| D781,336 S | 3/2017 | Butcher et al. | |
| D809,003 S | 1/2018 | Sowden et al. | |
| 2003/0085913 A1 | 5/2003 | Ahmad et al. | |
| 2003/0117651 A1 | 6/2003 | Matraszek et al. | |
| 2006/0120618 A1 | 6/2006 | Mizoguchi | |
| 2006/0184966 A1 | 8/2006 | Hunleth et al. | |
| 2008/0034317 A1 | 2/2008 | Fard et al. | |
| 2009/0322915 A1 | 12/2009 | Cutler | |
| 2010/0313156 A1* | 12/2010 | Louch | G06F 3/0481 715/769 |
| 2011/0305392 A1 | 12/2011 | Kapoor et al. | |
| 2012/0076427 A1 | 3/2012 | Hibino et al. | |
| 2012/0166986 A1* | 6/2012 | Trotta | G06F 3/0481 715/765 |
| 2012/0206771 A1 | 8/2012 | Cok | |
| 2012/0299933 A1* | 11/2012 | Lau | G06T 13/80 345/473 |
| 2012/0308132 A1 | 12/2012 | Zimmer | |
| 2013/0055061 A1* | 2/2013 | Ashley-Rollman | G06F 17/245 715/228 |
| 2013/0239049 A1 | 9/2013 | Perrodin et al. | |
| 2013/0328888 A1* | 12/2013 | Beaver | G06T 13/80 345/473 |
| 2014/0168272 A1 | 6/2014 | Chedeau et al. | |
| 2014/0258903 A1 | 9/2014 | Kanbara et al. | |
| 2014/0317565 A1* | 10/2014 | Bergmans | G06F 3/0488 715/810 |
| 2015/0117785 A1 | 4/2015 | Lee et al. | |
| 2015/0134323 A1 | 5/2015 | Cuthbert et al. | |
| 2015/0378556 A1* | 12/2015 | Ramanathan | G06F 3/04817 715/765 |
| 2016/0019221 A1* | 1/2016 | Knoll | G06F 17/30058 715/202 |
| 2016/0070953 A1 | 3/2016 | Yamaji | |
| 2016/0139761 A1 | 5/2016 | Grosz et al. | |
| 2016/0248993 A1 | 8/2016 | Sato | |
| 2017/0091973 A1 | 3/2017 | Lee et al. | |
| 2017/0301126 A1* | 10/2017 | Habib | G06T 13/80 |

OTHER PUBLICATIONS

USPTO, Notice of Allowance for Design U.S. Appl. No. 29/562,553, dated Feb. 28, 2018, 9 pages.

USPTO, First Action Interview, Pre-Interview Communication for U.S. Appl. No. 15/362,725, dated Jan. 23, 2018, 28 pages.

MartinRGB, "Photo Edit", Posted at dribble, posting date Sep. 15, 2015 [online, site visited Apr. 14, 2017]; URL: https://dribble.com/shots/2245937-Photo-Edit, Sep. 15, 2015, 2 pages.

Maxromanchuk, "Photo Album", Posted at dribble, posting date Feb. 5, 2015 [online, site visited Apr. 14, 2017]; URL: https://dribble.com/shots/1917342-Photo-Album, Feb. 5, 2015, 2 pages.

Quevedo, "Grid Responsive Image Gallery", Posted at YouTube, posting date Nov. 8, 2013 [online; site visited Apr. 14, 2017]; URL: https://www.youtube.com/watch?v=yh_llYtQHjE, Nov. 8, 2013, 2 pages.

Sumi, "Grid Diary with Photo", Posted at dribble, posting dated Jul. 28, 2014 [online, site visited Apr. 14, 2017]; URL: https://dribble.com/shots/1659823-Grid-Diary-with-Photo, Jul. 28, 2014, 3 pages.

USPTO, Non-final Office Action for Design U.S. Appl. No. 29/562,553, dated Apr. 21, 2017, 15 pages.

USPTO, Non-final Office Action for Design U.S. Appl. No. 29/562,554, dated Apr. 25, 2017, 15 pages.

European Patent Office, International Search Report for International Patent Application No. PCT/US2016/068437, dated Mar. 21, 2017, 5 pages.

European Patent Office, Written Opinion for International Patent Application No. PCT/US2016/068437, dated Mar. 21, 2017, 9 pages.

USPTO, Restriction Requirement for Design U.S. Appl. No. 29/562,553, dated Sep. 26, 2017, 6 pages.

USPTO, Notice of Allowance for Design U.S. Appl. No. 29/562,554, dated Sep. 27, 2017, 7 pages.

EPO, Written Opinion of the International Preliminary Examining Authority for International Patent Application No. PCT/US2016/068437, dated Apr. 4, 2018, 8 pages.

EPO, Written Opinion of the International Preliminary Examining Authority for International Patent Application No. PCT/US2016/068437, dated Jul. 11, 2018, 8 pages.

USPTO, Notice of Allowance for U.S. Appl. No. 15/362,725, dated Jul. 25, 2018, 14 pages.

\* cited by examiner

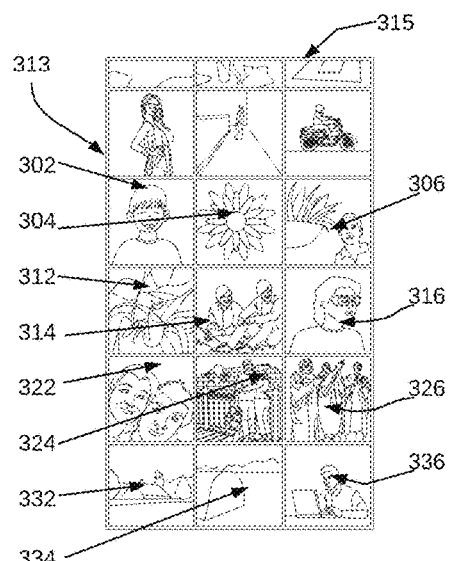
FIG. 3A   FIG. 3B   FIG. 3C
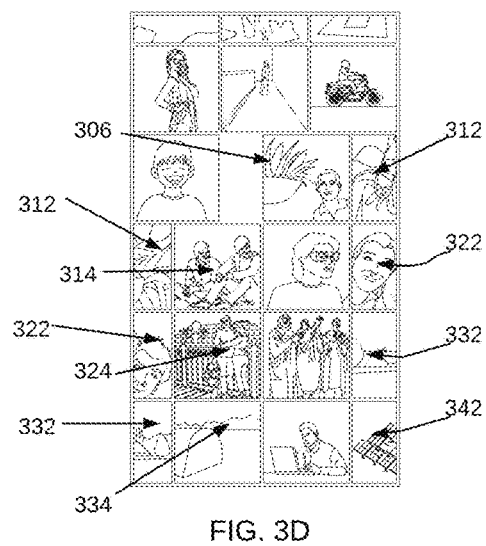
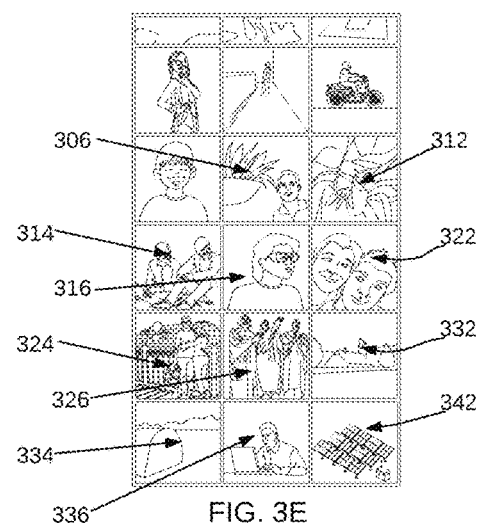
FIG. 3D   FIG. 3E

ANIMATION OF USER INTERFACE ELEMENTS

BACKGROUND

Computer user interfaces utilize various user interface elements. Some user interfaces may include user interface elements arranged in a grid. For example, icons may be arranged in a grid of rows and columns. In another example, photo thumbnails may be arranged in a grid. Different software applications may permit users to add to, delete from, or rearrange user interface elements arranged in a grid.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations of the present application relate to techniques to generate and display animations of user interface elements. In some implementations, a computer-executed method includes receiving user input indicative of manipulation of a particular user interface element with respect to a grid including a plurality of user interface elements arranged in a display area, and identifying, based on the user input, at least a first row and a second row of the grid to be updated. The method includes generating an animation to update the grid, where the animation includes an update of the second row of the grid, and one or more transitions comprising at least one of transition of a first user interface element from the first row to outside the display area along a first direction, and transition of a second user interface element into the first row from outside the display area along a second direction, where the second direction is different from the first direction. The method causes the animation to be displayed.

Various implementations and examples of the method are described. For example, the particular user interface element can be included in the grid, and receiving user input can include receiving indication to remove the particular user interface element from the grid. For example, the particular user interface element can be in the first row, and the received indication can be to remove the particular user interface element from the grid. Generating the animation can further include removing the particular user interface element from the first row of the grid. In some implementations, the particular user interface element can be from a row of the grid different from the first row, and receiving user input can include receiving indication to move the particular user interface element to the first row of the grid. In some implementations, the particular user interface element is not part of the grid, and receiving user input can include receiving indication to insert the particular user interface element into the grid. For example, the indication can be to insert the particular user interface element into the first row.

Generating the animation can further include adjusting a dimension of the first row based on a size of the first user interface element and/or the second user interface element. The method can further comprise determining a display direction for the display area; and based on the display direction, selecting at least one of the first direction and the second direction. For example, the display direction can be a left-to-right direction, the first direction can be the left to-right direction, and the second direction can be a right-to-left direction. In some implementations, the first row and the second row can be adjacent in the grid, and the update of the second row of the grid can include transition of the first user interface element from outside the display area into the second row along the first direction, and/or transition of the second user interface element from the second row to outside the display area along the second direction. In some implementations, the update of the second row of the grid further includes cross-fade of one or more user interface elements in the second row to one or more other user interface elements of the grid without displaying motion of the other user elements across positions of the grid. The method can further include identifying a third row of the grid for updates, where generating the animation includes update of the third row of the grid. In some examples, the grid represents at least a portion of a photo album and the plurality of user interface elements in the grid are images or image thumbnails, where the user input instructs the particular user interface element to be added to or removed from the photo album.

In some implementations, a computer readable medium can have stored thereon software instructions that, when executed by a processor, cause the processor to perform operations. The operations include receiving user input indicative of manipulation of a particular user interface element with respect to a grid including a plurality of user interface elements arranged in a display area, and identifying, based on the user input, at least a first row and a second row of the grid to be updated. The operations include generating an animation to update the grid, where the animation comprises one or more transitions comprising one of: transition of a first user interface element from the first row to outside the display area along a first direction followed by transition of the first user interface element from outside the display area to the second row along the first direction; and transition of a second user interface element from the second row to outside the display area along a second direction followed by transition of the second user interface element into the first row from outside the display area along the second direction, where the second direction is different from the first direction. The operations include causing the animation to be displayed.

In various implementations of the computer readable medium, the particular user interface element can be included in the grid, where the operation of receiving user input includes receiving indication to remove the particular user interface element from the first row, and the one or more transitions include the transitions of the second user interface element. In some implementations, the particular user interface element is not part of the grid, where the operation of receiving user input includes receiving indication to insert the particular user interface element into the first row, and the one or more transitions include the transitions of the first user interface element.

In some implementations, a system includes a storage device and at least one processor configured to access the storage device and configured to perform operations including receiving user input indicative of manipulation of a particular user interface element, and identifying, based on the user input, at least a first row and a second row of a grid to be updated based on the manipulation of the particular user interface element, where the grid comprises a plurality of user interface elements arranged in a display area. The operations include generating an animation to update the grid. The animation includes update of the second row of the grid, and one or more transitions including at least one of: transition of a first user interface element from the first row to outside the display area along a first direction, and transition of a second user interface element into the first row from outside the display area along a second direction, where the second direction is opposite to the first direction. The operations include causing the animation to be displayed.

Various implementations and examples of the system are described. For example, the manipulation can include one of insertion of the particular user interface element into the grid, removal of the particular interface element from the grid, and movement of the first user interface element from a first position in the grid to a second position in the grid. The first row and the second row can be adjacent in the grid, and the operation including update of the second row of the grid can include at least one of: transition of the first user interface element from outside the display area into the second row along the first direction, and transition of the second user interface element from the second row to outside the display area along the second direction. The operation including update of the second row of the grid can further include cross-fade of one or more user interface elements in the second row to one or more other user interface elements of the grid without displaying motion of the other user elements across positions of the grid.

BRIEF DESCRIPTION OF THE DRAWINGS

FIGS. 3A-3E are diagrammatic illustrations of stages in an example animation generated according to some implementations;

DETAILED DESCRIPTION

Figure 1A:
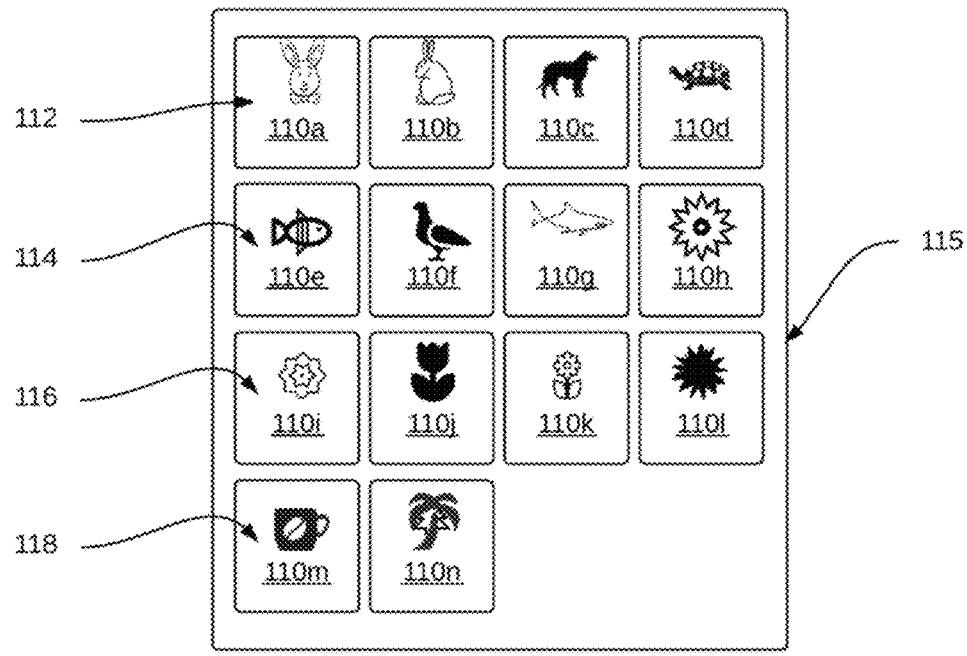
FIGS. 1A-1D are diagrammatic illustrations of example user interfaces with user interface elements arranged in a grid, according to some implementations.

One or more implementations described herein relate to techniques to generate and display animations of user interface elements. In some implementations, a system can receive user input indicating manipulation of a particular user interface element with respect to a grid. The grid includes multiple user interface elements arranged in a display area, e.g., a grid of multiple rows of interface elements such as images, icons, etc. For example, the user manipulation can be insertion of the particular interface element into the grid, removal of the particular interface element from the grid, movement of the particular interface element from a first position in the grid to a second position in the grid, or a combination of two or more of these. Multiple particular interface elements can also be manipulated. The system can generate and/or cause a display of an animation updating the grid of elements and which displays transitions of the user interface elements based on the user's manipulation.

The transitions can include a transition of a first user interface element from a first row of the grid to outside the display area of the grid along a first direction, and/or a transition of a second user interface element into the first row from outside the display area along a second direction. For example, if an interface element is removed from the grid in the first row, elements after and in the same row as the removed element can be moved to fill the empty position of the removed element. Furthermore, the next interface element in the next row (e.g., under the first row) can be moved to outside the display area and moved into the first row from outside the display area, thus shifting to the first row. A similar process can be performed in an opposite manner for adding an interface element to the first row, e.g., shifting an edge interface element into the next row. For example, this allows interface elements to be moved over shorter distances in and out of grid edges rather than be moved in larger distances across the grid.

Additional features include moving interface elements in additional rows of the grid positioned after the manipulated row, including similar transitions for one or more elements at edge positions of the grid. Some implementations can cross-fade one or more user interface elements to one or more other user interface elements of the grid without displaying individual motion of the other user elements across positions of the grid, thus further reducing confusing animations for elements that are moved larger distances. Individual animated movements of the interface elements can be adjusted in speed so that the start and end times of movement are approximately the same for the moved user interface elements regardless of distances moved. Some implementations can provide user interface elements of different sizes, and, for example, can adjust a dimension of a row of elements based on a size of an interface element that is moved into the row from outside the display area.

Features described herein allow user interface elements in a displayed grid to be animated to indicate changes in position based on user manipulations without confusing a user. User interface animations provide users with immediate visual feedback of actions performed in response to user input. However, complex movement of elements may not be easy for a user to comprehend. Described techniques can generate simple animations that can provide visual feedback to the user. Further, techniques of this disclosure may also be intuitively easy for a user to comprehend. For example, user interface elements may be moved to new positions in a grid using animations that clearly show the changes being made to the grid of interface elements, and without animations that confusingly show direct, often overlapping, movement of the moving user interface elements from initial positions to final positions in the grid. The resulting clarity of user manipulations based on described techniques is further enhanced when multiple interface elements are animated as a result of user input. Thus, clarity of the user interface and manipulation of grid interface elements is increased, allowing more effective manipulation by users of those elements.

Features described herein can allow a system to display results of user manipulations to a grid of elements using relatively low computational resources, e.g., by clarifying, reducing, and/or avoiding particular animated movement of interface elements. Further, animations according to one or more described features can provide results quickly and clearly without significant time requirements to show the animations. Described techniques can allow reduction of manual reviewing of element grids by users resulting from user input. Consequently, a technical effect of one or more described implementations is that manipulation and display of user interface elements is reduced in computational time and resources expended to obtain results. For example, a technical effect of described features is a reduction in the problem of consumption of system processing resources required for manipulation and display of user interface elements that may otherwise be used by a system to animate user elements and/or provide clarity and confirmation to users that a grid of elements has been manipulated in a desired manner.

The systems and methods discussed herein do not require collection or usage of user personal information. In situations in which certain implementations discussed herein may collect or use personal information about users (e.g., user data, information about a user's social network, user's location, user's biometric information, user's activities and demographic information), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so. For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

A "user interface element" as referred to herein can be any graphic rendered in a computer display. In different implementations, the user interface elements can include any type of graphical user interface (GUI) object, such as icons, photos or other images, table cells, game pieces, cinemagraphs, videos etc. The user interface elements may be arranged in a grid in a display area.

In some examples, the user interface elements are photos from a user's photo album. For example, in some implementations a user can provide user input to cause the grid to scroll vertically and display additional photos of the photo album. The user can add additional photos to the photo album by adding or inserting photo elements to the grid (e.g., based on a command or other user input, or dragged from a different displayed grid, window, etc.). Alternatively, the user can delete photos from the photo album by deleting photo elements from the grid. In some implementations, the user can rearrange the photo elements in the grid, e.g., provide a different display order or other order of the photos, by moving a photo element from one position in the grid to another position in the grid. Other examples of types of user interface elements that can be used in the grid are also described herein.

FIG. 1A is a diagrammatic illustration of an example user interface with user interface elements arranged in a grid of rows, according to some implementations. User interface elements 110a-110n, collectively referred to henceforth as 110, are arranged in a display area 115. Each user interface element 110a-110n may be any type of GUI object. In the example shown in FIG. 1A, user interface elements 110 are shown substantially square in shape and of identical size. For example, user interface element 110a includes an image inside a square, user interface element 110b includes another image inside a square, and so on. In some examples, user interface elements 110 may be game pieces, each representing a particular letter of the English alphabet or other symbols, characters, emoji, etc.

In the example shown in FIG. 1A, user interface elements 110 are arranged in a grid of rows, including rows 112, 114, 116, and 118. Row 112 includes user interface elements 110a-110d, row 114 includes user interface elements 110e-110h, row 116 includes user interface elements 110i-110l, and row 118 includes user interface elements 110m and 110n. In this example, user interface elements that are part of a particular row are arranged in a linear manner in a horizontal direction. In this example, rows 112, 114, and 116 each include four user interface elements that together substantially span the width of the display area. Rows 112, 114, and 116 are therefore full. Row 118 includes two elements that together span only a portion of the width of the display area, and row 118 is therefore not full. Therefore, in the example shown in FIG. 1A, there are three full rows (rows 112, 114, and 116) and one row (row 118) that is not full.

Figure 1B:
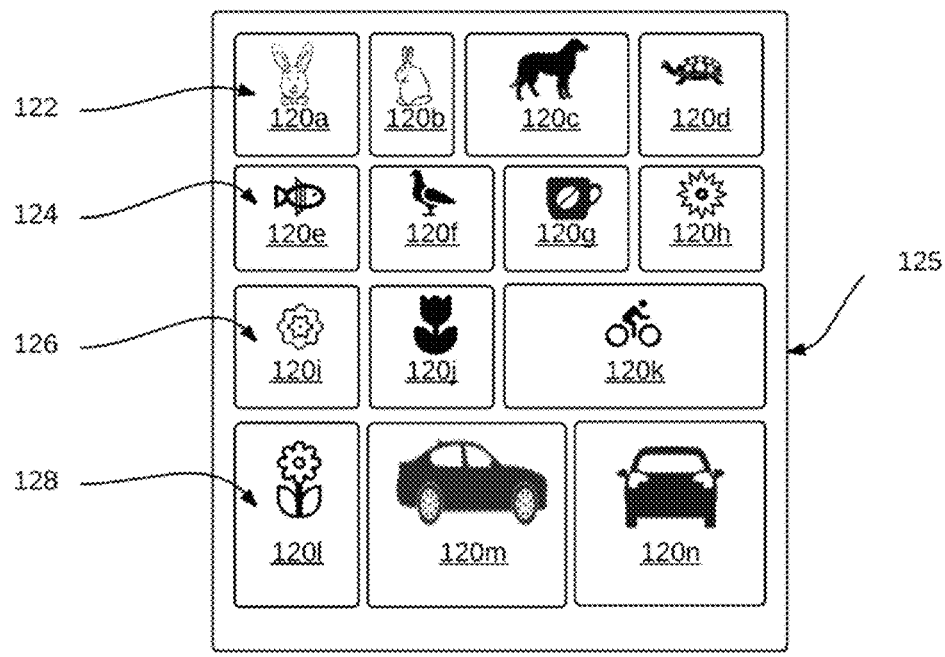

FIG. 1B is a diagrammatic illustration of another example user interface with user interface elements arranged in a grid, according to some implementations. User interface elements 120a-120n, collectively referred to henceforth as 120, are arranged in a display area 125. Each user interface element 120a-120n may be any type of GUI object. In the example shown in FIG. 1B, user interface elements 120 are shown substantially rectangular in shape and of different sizes, e.g., having one or more different dimensions. For example, user interface element 120a includes an image inside a square, user interface element 120b includes another image inside a rectangle that has a smaller width than height, user interface element 120c includes another image inside a rectangle that has a larger width than height, and so on.

In the example shown in FIG. 1B, user interface elements 120 are arranged in a grid of rows, including rows 122, 124, 126, and 128. Row 122 includes user interface elements 120a-120d, row 124 includes user interface elements 120e-120h, row 126 includes user interface elements 120i-120k, and row 128 includes user interface elements 120l, 120m, and 120n. In this example, user interface elements that are part of a particular row are all arranged in a linear manner in a horizontal direction. Rows 122 and 124 each include four user interface elements and substantially span the width of the display area. Rows 126 and 128 each include three user interface elements that together span substantially the width of the display area. In the example shown in FIG. 1B, there are four full rows (rows 122-128) and no rows that are not full.

Figure 1C:
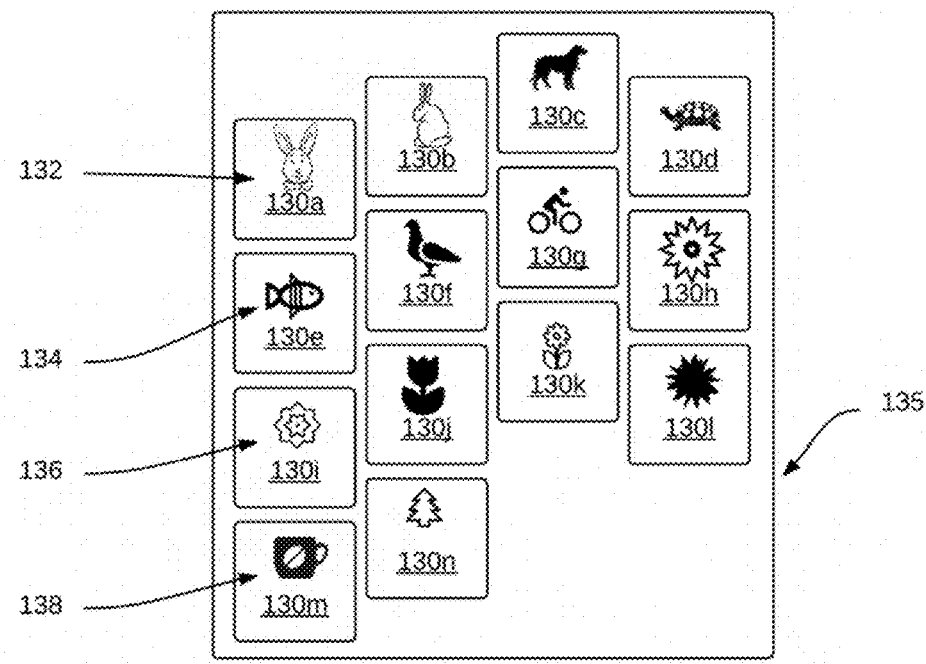

FIG. 1C is a diagrammatic illustration of another example user interface with user interface elements arranged in a grid, according to some implementations. User interface elements 130a-130n, collectively referred to henceforth as 130, are arranged in a display area 135. Each user interface element 130a-130n may be any type of GUI object, for example. In the example shown in FIG. 1C, user interface elements 130 are shown substantially square in shape and of identical size, but may be of different shapes and/or sizes.

In the example shown in FIG. 1C, user interface elements 130 are arranged in a grid of rows, including rows 132, 134, 136, and 138. Row 132 includes user interface elements 130a-130d, row 134 includes user interface elements 130e-130h, row 136 includes user interface elements 130i-130l, and row 138 includes user interface elements 130m and 130n. In this example, user interface elements that are part of a particular row are all arranged in an angular manner. Specifically, each of rows 132, 134, 136, and 138 is arranged such that the first three user interface elements in the row are along a first line sloping upward, starting at the first user interface element in the row, and the fourth user interface element in the row is along a second line sloping downward from the third user interface element in the row. In this example, rows 132, 134, and 136 each include four user interface elements that together substantially span the width of the display area. Rows 132, 134, and 136 can be considered full. Row 138 includes two elements that together span only a portion of the width of the display area. Therefore, in the example shown in FIG. 1A, there are three full rows (rows 132, 134, and 136) and one row (row 138) that is not full.

Figure 1D:
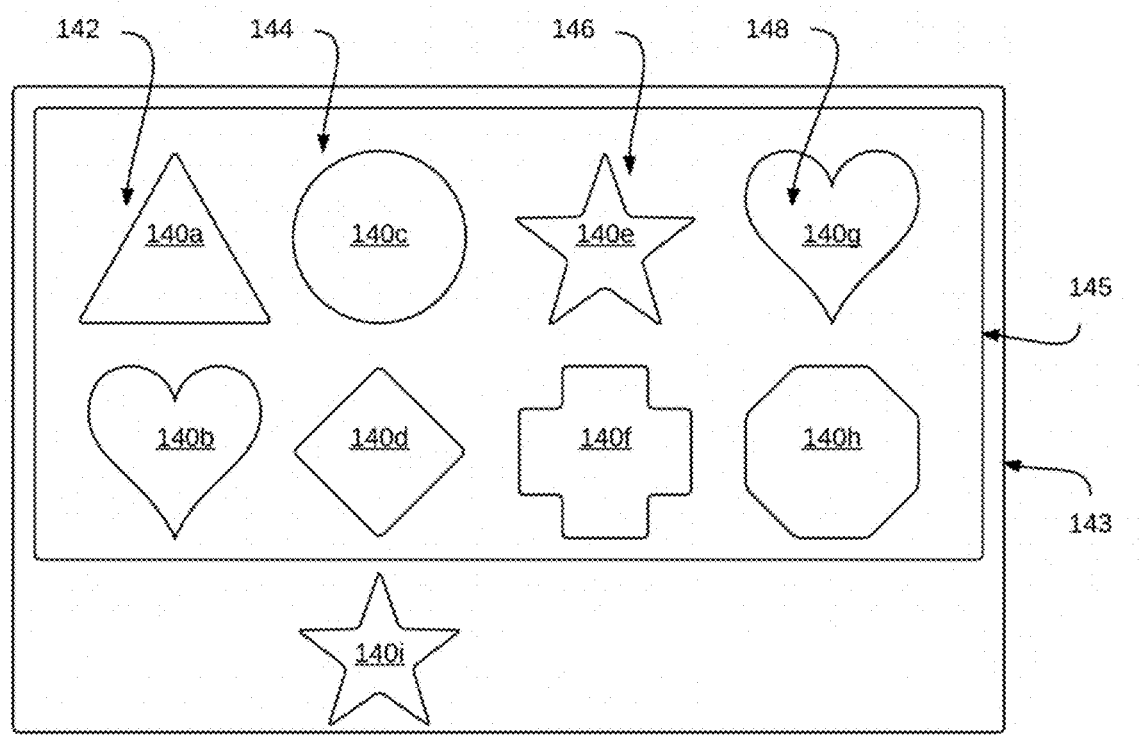

FIG. 1D is a diagrammatic illustration of an example user interface with user interface elements arranged in a grid of rows, according to some implementations. User interface elements 140a-140i, collectively referred to as 140, are arranged in a display area 145. Each user interface element 140a-140i may be any type of GUI object. In the example shown in FIG. 1D, user interface elements 140 are shown of different shapes and sizes. For example, user interface elements 140 may be icons, e.g., used to represent computer files, folders, application, devices, and so on, in a graphical user interface.

In the example shown in FIG. 1D, user interface elements 140 are arranged in a grid of rows, including rows 142, 144, 146, and 148. In this example, user interface elements that are part of a particular row are all arranged in a linear manner in a vertical direction. Row 142 includes user interface elements 140a and 140b, row 144 includes user interface elements 140c-140d, row 146 includes user interface elements 140e-140f, and row 148 includes user interface elements 140g and 140h. In this example, rows 142, 144, 146, and 148 each include two user interface elements that together substantially span the height of the display area. Since rows 142-148 are arranged in a vertical direction, rows 142, 144, 146, and 148 are therefore full. Thus, in the example shown in FIG. 1D, there are four full rows (rows 142, 144, 146, and 148).

In some implementations, a display area may span only a portion of the available display. For example, in FIG. 1D, the display area 145 spans only a portion of the display 143. For example, display areas that do not span the entire display may correspond to user interface windows (e.g., not maximized, not full screen) in a graphical user interface. For example, display areas that do not span the entire display may include display areas that correspond to a folder window (e.g., a folder of icons). In the example shown in FIG. 1D, an additional user interface element 140i that is not a part of the grid is positioned outside the display area 145 on the display 143. For example, user interface element 140i may correspond to an icon that has not been placed within a folder represented in the display area 145.

While FIGS. 1A-1D each show a grid of four rows, in various implementations, there may be any number of rows in the display area. Further, in some implementations, there may be any number of full rows (e.g., based on size of the display area 115, 125, 135, or 145), and no rows that are not full. The number of rows may be based on a total number of user interface elements that are to be displayed in the display area, a zoom level, a type of user interface element, etc. For example, if the display area covers the entire available display, the grid may include a relatively high number of rows, whereas if the display area covers only a portion of the available display, the grid may include a relatively small number of rows.

In some implementations, the user interface elements may include elements that are of a configurable size. In these implementations, the user interface elements may be displayed in the grid at different sizes. In these implementations, the grid may include a relatively high number of rows, e.g., when the user interface elements are zoomed out on the display and are displayed as small thumbnails. Further, in these implementations, the grid may include a relatively small number of rows, e.g., when the user interface elements are zoomed in on the display.

In some implementations, the user interface elements may include elements that are of a fixed size. In these implementations, the user interface elements that are substantially of the same size, e.g., as shown in FIG. 1A. Further, in some implementations, the grid may include user interface elements that are substantially of the same size but having different shapes, e.g., as shown in FIG. 1B, in which the user interface elements 120 are of different shapes having different heights in different rows. In another example, the user interface elements may be of a variety of shapes, all within a particular size, e.g., as shown in FIG. 1D. In some implementations, the grid may include icons or images of different sizes as shapes, e.g., images as shown in FIG. 1B.

In some implementations, the user interface elements may have particular aspect ratios. For example, when the user interface elements are photos, the size and shape may be based on an aspect ratio of the photos, e.g., 4:3, 16:9, 3:5, 4:6 etc. In this example, a grid of user interface elements may include rectangles of different sizes, based on the aspect ratio, e.g., as shown in FIG. 1B.

In some implementations, it may be advantageous to display the user interface elements in a grid of rows configured in a substantially linear manner, e.g., as shown in FIGS. 1A-1C. In some implementations, it may be advantageous to display the user interface elements in a grid of rows configured in other ways. For example, when the user interface elements may correspond to game pieces, e.g., virtual game pieces, game rules may dictate that the user interface elements be arranged in particular configurations of a grid that corresponds to a layout of a game. FIG. 1C illustrates one such arrangement of grid of rows.

In some implementations, the user interface may be based on particular display directions. In different implementations, the display direction may be selected based on a user preference such as language, region, or locale. For example, when the user preference indicates a language such as English, with a left-to-right direction for written text and top-to-bottom direction for multiple lines of text, the display direction may be set "left-to-right" with a follow-on display direction "top-to-bottom." In another example, when the user preference indicates a language such as Arabic, with a right-to-left direction for written text and top-to-bottom direction for multiple lines of text, the display direction may be set "right-to-left" with a follow-on display direction "top-to-bottom." In yet another example, when the user preference indicates a language such as Japanese, with a top-to-bottom direction for written text and right-to-left direction for multiple lines of text, the display direction may be set "top-to-bottom" with a follow-on display direction "right-to-left." Setting the display direction based on the user preference may be beneficial by providing users with a user interface that enables more natural interaction, as explained in greater detail below.

User interface animations provide users with immediate visual feedback of actions performed in response to user input. For example, in a conventional drag-and-drop animation of a user interface element, a direct animation may be utilized to show the user interface element being dragged from an initial position to a final position of the drag-and-drop. While such animations may match user expectations and be easy to understand, these may not be suitable in certain contexts. For example, in a grid of user interface elements, such as those illustrated in FIGS. 1A-1D, multiple user interface elements may be animated as a result of input. For example, if the input indicates removal of two of the user interface elements, a direct animation may result in complex movement of user interface elements in the display area. In this example, if direct animation is utilized, some user interface elements may be animated moving across the display area from left to right and from bottom to top. Further, some user interface elements may be animated moving across the display area from right to left in the same row. Such complex movement may not be easy for a user to comprehend. This disclosure describes techniques to generate simple animations that can provide visual feedback to the user. Further, techniques of this disclosure may also be intuitively easy for a user to comprehend.

Figure 2:
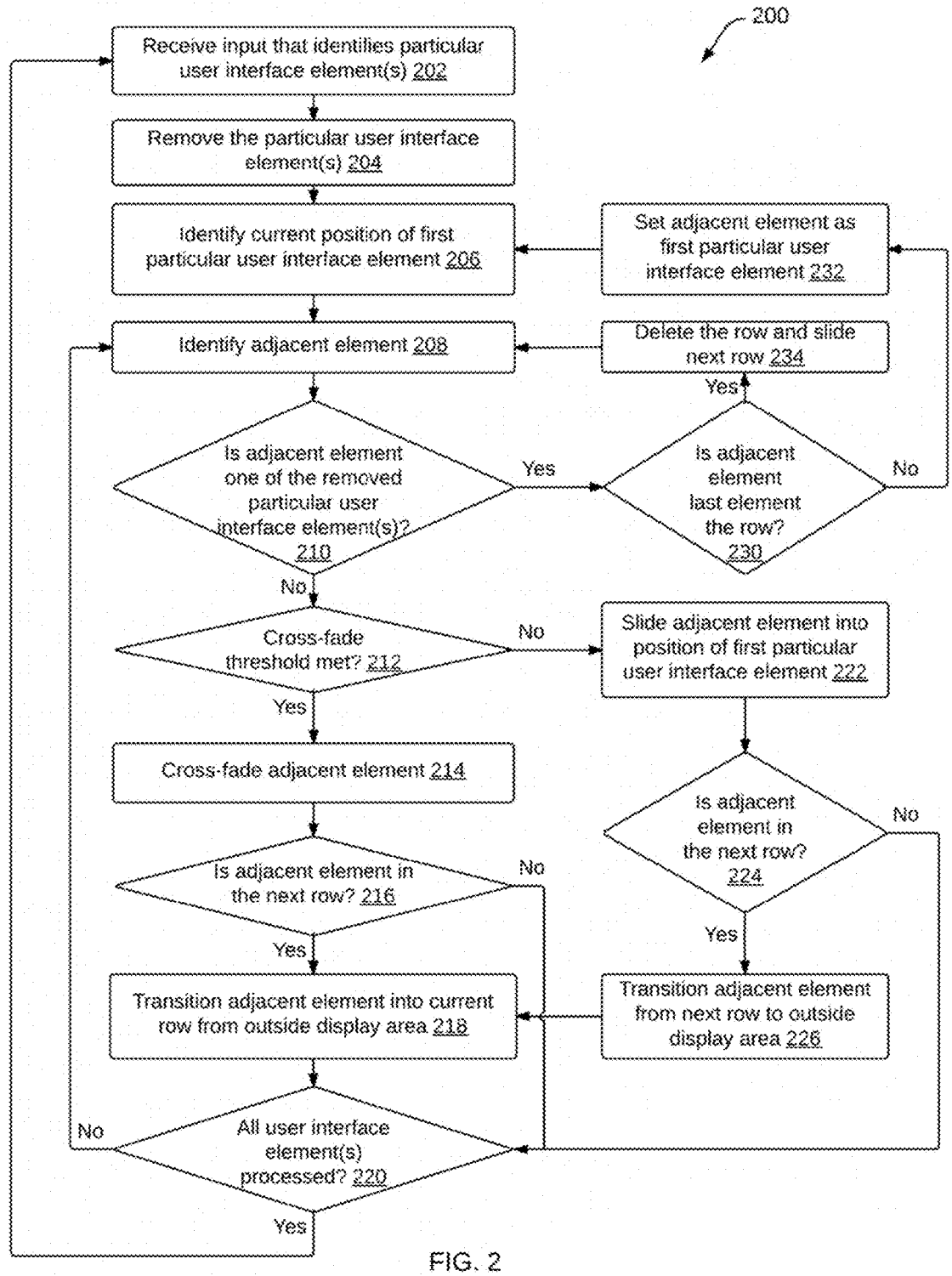
FIG. 2 is a flow diagram illustrating an example method to generate an animation indicating removal of a user interface element, according to some implementations.

FIG. 2 is a flow diagram illustrating an example method 200 to generate an animation indicating removal of a user interface element, according to some implementations. In various implementations, some or all of the method 200 can be implemented on a client device, such as a smartphone, a tablet, a personal computer, a wearable device etc., on one or more server devices such as a web server, a cloud-based server etc., and/or on both server device(s) and client device(s). In described examples, the implementing system includes one or more digital processors or processing circuitry ("processors"), and one or more storage devices. In some implementations, different components of one or more servers and/or clients can perform different blocks or other parts of the method 200.

Some implementations can initiate method 200 based on user input. A user may, for example, have selected initiation of the method 200 from a displayed user interface. For example, the user may have provided input regarding manipulation of one or more user interface elements, e.g., user interface elements 110, 120, 130, and 140. In the description of method 200, it is assumed that the display direction is left-to-right and that the follow-on display direction is top-to-bottom, e.g., as shown in FIGS. 1A and 1B. Method 200 can also be applied to user interface element grids that utilize other display directions, e.g., the user interface element grids shown in FIGS. 1C and 1D or other directions as described above.

In block 202, input that identifies one or more particular user interface elements is received. For example, the user interface elements may be images or image thumbnails that represent one or more images. In this example, the received input may be a selection of one or more images or image thumbnails that are to be removed, e.g., deleted from a particular collection, other set of images, or area of storage of a client device or server device. In another example, the user interface elements may be icons that represent one or more software applications available to a user or one or more functions of a device or application selectable by a user. In this example, the received input may be a selection of one or more icons that correspond to applications that are to be removed, e.g., uninstalled from storage of a client device or a server. In different examples, the input may be received directly from a user, e.g., via a touchscreen, a gesture recognition interface, a keyboard, a mouse, a microphone, a touchpad, or other input device. In some examples, e.g., when a software application is uninstalled from a device, an interface element (e.g., icon) to be removed is received in block 502 for removed from a grid displayed on that device. The method continues to block 204.

In block 204, the particular user interface element(s) are removed from the display area, e.g., display area 115, 125, 135, or 145. In some implementations, a removal effect may be displayed as the one or more particular user interface elements are removed from the display area. For example, the effect may be a progressive reduction in size, e.g., by shrinking the user interface elements that are removed. In some examples, the user interface elements that are removed may be animated to shrink to a point within borders of the user interface element, e.g., a point at the center of (or other location in) the user interface element position, and the point is then removed from the display. In one example, the borders of a user interface element can be shrunk to a point, and contents (e.g., image or icon) within the element borders can remain at its original display size during the shrinking, where the content is cropped by the shrinking borders such that no content is displayed outside the borders as it is shrinking. In another example, the contents within the borders can be shrunk at the same rate as the borders of the user interface element are shrunk.

In some examples, the removal effect may be a progressive fading, e.g., by fading the color of the user interface elements that are removed, e.g., to grey color, to white color, etc. In different implementations, various combinations of shrinking and fading may be used. In some implementations, the one or more particular user interface elements may be removed instantly, e.g., replaced by empty space. In different examples, empty space may be represented in different ways, e.g., in white color, in grey color etc. The method continues to block 206.

In block 206, the current position of the first particular user interface element of the one or more particular user interface elements is identified. The current position is a position of the first particular user interface element in the grid of user interface elements prior to removal. For example, when the display direction is "left-to-right" and the follow-on display direction is "top-to-bottom," the first particular user interface element is closest to the top and left corner of the display area. In another example, the first particular user interface element may be selected, e.g., randomly, or in any order, from the one or more particular user interface elements. The method continues to block 208.

In block 208, an adjacent element of the first particular user interface element is identified. In some examples, a user interface element that is immediately to the right of the first particular user interface element in the same row is the adjacent element. Continuing with this example, if the first particular user interface element is the last element in a row, e.g., the rightmost element in the row, the adjacent element is the first element in the next row in the top-to-bottom direction, e.g., the leftmost element in the next row. The method continues to block 210.

In block 210, it is determined whether the adjacent element is one of the one or more particular user interface elements that are removed. If the adjacent element is not one of the one or more particular user interface elements that are removed, block 212 may be performed. If the adjacent element is one of the one or more particular user interface elements that are removed, block 230 may be performed.

In block 212, it is determined whether a cross-fade threshold is met. In an implementation where the display direction is "left-to-right" and the follow-on display direction is "top-to-bottom," an order of user interface elements in the grid may be determined as follows: a user interface element is determined as positioned before another user interface element when it is in a position that is to the left of the another user interface element in the same row, or when it is in a row that is above the row of the another user interface element. A cross-fade threshold may be selected to provide simple animation of user interface elements in the grid. For example, in some implementations, movement of user interface elements may be restricted to be within a same row. Further, in some implementations, a given user interface element may be moved by a particular limited number of positions in a row, e.g., by one position. In some implementations, the cross-fade threshold may be selected to permit a user interface element to take up a new position in the grid without being animated as directly being moved to the new position.

In some implementations, a cross-fade threshold may be met when the adjacent element is in a different row than the first particular user interface element and when at least a threshold number of particular user interface elements that are removed are positioned in the grid before the adjacent element. In some implementations, the threshold number is two. Other threshold numbers can alternatively be used. In some implementations, a cross-fade threshold may be not met when the adjacent element is in the same row as the first particular user interface element. If the cross-fade threshold is met, block 214 may be performed. If the cross-fade threshold is not met, block 222 may be performed.

In block 214, a cross-fade effect is applied to the adjacent element. A cross-fade effect, as referred to herein, directly replaces an interface element with a different interface element in the grid without displaying individual animated movement (or other movement) of the different interface element across one or more positions of the grid. In some implementations, the different interface element has an ending position in the grid at the position of the replaced interface element.

In some examples of a cross-fade effect, each user interface element in the grid may comprise an image formed by a plurality of pixel values, each pixel value corresponding to a particular pixel location in the image. For example, if a user interface element is ten pixels wide and ten pixels tall, it may include a total of one hundred pixel values. In some implementations, a cross-fade effect may be applied by generating one or more intermediate images between the replaced element image and the replacing element image. Each of the one or more intermediate images may include a first plurality of pixel values for a first subset of pixel locations from the adjacent element and a second plurality of pixel values for a second subset of pixel locations from a user interface element placed immediately after the adjacent element in the grid (the replacing element), such that the first subset and the second subset are mutually exclusive. In some implementations, pixel values from the adjacent element and the user interface element placed immediately after the adjacent element in the grid may be combined to provide the cross-fade effect, e.g., the pixel values may be added, multiplied etc. FIG. 4C shows an example animation with a cross-fade effect. When displayed in a sequence, the one or more intermediate images may produce an effect of one image (e.g., the adjacent element) changing into another image (e.g., the user interface element placed immediately after the adjacent element in the grid). The cross-fade effect may permit a user interface element to take up a new position in the grid without being animated as directly being moved to the new position. Use of the cross-fade effect may therefore generate an animation of lower complexity than a direct animation. In some implementations, a cross-fade effect can be implemented in other ways. For example, the cross-fade effect (e.g., an element-change effect) can be more abrupt, without gradual fade, to replace the original user element with the replacing user element. The method continues to block 216.

In block 216, it is determined if the adjacent element is in a next row from the first particular user interface element. If the adjacent element is in the next row from the first particular user interface element, block 218 may be performed. If the adjacent element is not in the next row from the first particular user interface element, block 220 may be performed.

In block 218, the adjacent element is transitioned into the row of the first particular user interface element (referred to as "current row") from outside display area 218. In some implementations, transitioning may involve generating one or more intermediate images, each including a portion of the adjacent element and positioned in the current row on the right hand side. Each intermediate image may include progressively greater portions of the adjacent element. When the intermediate images are displayed in a sequence, the intermediate images may produce an effect of the adjacent element sliding into the rightmost position in the current row. The method continues to block 220.

In block 220, it is determined whether all user interface elements in the display area have been processed. If all user interface elements have been processed, block 202 may be performed, e.g., to receive additional input. If all user interface elements have not been processed, block 208 may be performed to identify another adjacent element.

In block 230, which may be performed when it is determined in block 210 that the adjacent element is one of the removed particular user interface element(s), it is determined if the adjacent element is the last element in the row of the grid in which it is positioned. For example, the adjacent element may be the last element in the row when it is in a rightmost position in the row. If it is determined that the adjacent element is not the last element in the row, block 232 may be performed. If it is determined that the adjacent element is the last element in the row, block 234 may be performed.

In block 232, the adjacent element may be set as the first particular user interface element. The method may proceed to block 206 to identify the current position of the first particular user interface element, as described above.

In block 234, the row of user interface elements that includes the adjacent element may be deleted. In some implementations, row deletion may be shown as a transition of the next row of user interface elements into the position of the deleted row. For example, all user interface elements in the deleted row may be shrunk to zero height and removed from the display area. Further, the next row of user interface elements may be shown sliding into empty space resulting from the height shrinkage of the deleted row. Deleting the row in this manner may permit simpler animation than a direct animation. The method may proceed to block 208 to identify another adjacent element.

In block 222, which may be performed when it is determined in block 212 that the cross-fade threshold has not been met, the adjacent element may be slid into position of the first particular user interface element. For example, after the first user interface element is removed in block 204, the adjacent element may be slid into that position. FIGS. 3 and 4 illustrate some examples of adjacent elements sliding into positions of particular user interface elements.

In block 224, it is determined if the adjacent element is from a next row from the first particular user interface element. If it is determined that the adjacent element is from a next row from the first particular user interface element, block 226 may be performed. If it is determined that the adjacent element is not from a next row from the first particular user interface element, block 220 may be performed to determine if all user interface elements have been processed.

In block 226, the adjacent element is transitioned from its current position in the next row to outside the display area. In some implementations, transitioning may involve generating one or more intermediate images, each including a portion of the adjacent element and positioned in the next row on the left hand side. Each intermediate image may include progressively lesser portions of the adjacent element. When the intermediate images are displayed in a sequence, the intermediate images may produce an effect of the adjacent element sliding out from the leftmost position in the next row. The method continues to block 218 to transition the adjacent element into the current row from outside the display area.

In some implementations, transitions of various user interface elements may be performed such that a start time and/or an end time for the transitions are substantially the same for all of the user interface elements. For example, certain user interface elements may experience relatively greater motion than other user interface elements which may be cross-faded into a new position. In some implementations, transitions of the user interface elements may be performed using a time curve in order to achieve a similar start time and/or end time. FIG. 4 illustrates an example of such transitions. For example, a time curve can indicate the speed of an interface element within a given time range. In some examples, a time curve can be used to cause an interface element to be moved faster at the beginning of the movement and to be moved slower near the end of the movement of the element, or vice-versa.

In some implementations, transitioning an element may include adjusting a dimension of the row. For example, adjustment of dimension of the row may be performed based on a size of the adjacent user interface elements. For example, when the display direction is left-to-right and a follow-on display direction is top-to-bottom, if one or more of the adjacent user interface elements are sized such that a height dimension of the one or more adjacent user interface elements is larger than a width dimension, a height of the row may be adjusted together with the transitioning (movement) of the adjacent user interface elements. In another example, the size of the adjacent user interface elements may include an orientation, e.g., a portrait orientation or a landscape orientation. In this example, the dimension of the row may be adjusted based on the orientation of the adjacent user interface elements, which may enable improved display of the user interface elements. FIG. 7 illustrates an example of such adjustment of dimension of a row.

While method 200 has been described with reference to various blocks in FIG. 2, it may be understood that techniques described herein for animation of user interface elements may be performed without performing one or more of the blocks of FIG. 2. For example, some implementations may not perform a check to determine if a cross-fade threshold is met. In these implementations, cross-fade may be omitted, or may be performed for all user interface elements that undergo a change in position. In another example, some implementations may not include row deletion. In these implementations, determination of whether the adjacent element is the last element in its row may not be performed. In these implementations, if all elements in a row are deleted, user interface elements from the next row may transition, e.g., from the right hand side of the display area, to replace the deleted row. In some implementations, deletion of particular user interface elements and transition of adjacent elements may be performed in sequence. In some implementations, deletion of particular user interface elements and transition of adjacent elements may be performed at substantially (partially or completely) the same time.

In various implementations, the blocks described in FIG. 2 can be performed in a different order than shown and/or simultaneously (partially or completely) with other blocks, e.g., in parallel, where appropriate. Some blocks can be performed and later performed again, e.g., for a different element or data. In some implementations, blocks can be performed multiple times, in a different order, and/or at different times in the methods. In various implementations, some of the blocks may be combined. In some implementations, the methods can be implemented, for example, on a server system 102 as shown in FIG. 1. In some implementations, one or more client devices can perform one or more blocks instead of or in addition to a server system performing those blocks.

FIGS. 3A-3E are diagrammatic illustrations of stages in an example animation generated and displayed according to some implementations. In the example animation of FIGS. 3A-3E, the display direction is "left-to-right" and the follow-on display direction is "top-to-bottom." Some reference numerals are omitted from FIGS. 3B-3E for clarity. FIG. 3A illustrates an initial user interface. In FIG. 3A, a display area 315 includes a grid of user interface elements. The grid includes multiple rows. A first row includes user interface elements 302, 304, and 306. A second row includes user interface elements 312, 314, and 316. A third row includes user interface elements 322, 324, and 326. A fourth row includes user interface elements 332, 334, and 336. As shown in FIG. 3A, there may be additional rows in the grid in the user interface that are static, e.g., are not a part of the animation. For example, row 313, which includes three user interface elements that are shown directly above respective user interface elements 302, 304, and 306. Input may be received to remove a particular user interface element 304 from the user interface.

FIG. 3B-3D each show an intermediate stage of an example animation of removal of the particular user interface element 304. In FIG. 3B, a first stage of removal of the particular user interface element 304 from the display area 315 is illustrated. As shown in FIG. 3B, in the first stage of removal, the generated animation shows the particular user interface element 304 shrunk in size, e.g., by reducing the height and width of the particular user interface element 304. In different implementations, the particular user interface element 304 may be shrunk in size by reducing only one of height and width. In various implementations, the element 304 can be shrunk to a point in the center of the original area or position occupied by the element 304, or can be shrunk to a point at a different location within that original area. Some implementations can shrink the content (e.g., image, icon, etc.) within the borders of the element 304 at the same rate as shrinking the borders, as shown. Some implementations can shrink only the borders and leave the content within the element at its original size, e.g., where the content is cropped as the borders shrink so that no content is displayed outside the shrinking borders. In some implementations, the animation may show the removal of the particular user interface element 304 in other ways, such as by fading out the particular user interface element 304, a dissolve effect, a curtain effect, other shrinking effects (e.g., where one or more borders remain statically positioned in a dimension during shrinking), or other suitable changes to the particular user element 304. Different combinations of changes to the particular user interface element 304 may also be used.

In FIG. 3C, an intermediate stage of the animation is shown in which the particular user interface element 304 has been removed from the display area 315. An empty slot 350 is shown in the position previously occupied by the particular user interface element 304. In some implementations, other objects, such as placeholder objects, objects of specific color or fill pattern etc., may be included instead of the empty slot, while the user interface animation is in progress.

In FIG. 3D, another intermediate stage of the animation in which the user interface element 306, which is the first element in the display direction from the original position of the particular user interface element 304, is shown in transition in right-to-left direction in an animation. Further, the second user interface element 312 next to the user interface element 306 is illustrated in transition into the display area 315 in the right-to-left direction of the second row in an animation, such that only a portion of the second user interface element 312 which is inside the display area 315 is displayed in the second row. Further, the second user interface element 312 is also shown next to user interface element 314 in transition to outside the display in the right-to-left direction in the third row in an animation, such that only a portion of the second user interface element 312 which is inside the display area 315 is displayed in the third row. Other user interface elements that are in the top-to-bottom direction, e.g., 316, 322, 324, 326, 332, 334, and 336, are illustrated in transition by one position to the left in a similar manner. Further, user interface element 342 is illustrated in transition into the display area. In some implementations, e.g., if the user interface element 336 is a last user interface element in the display area, an empty slot may be displayed in place the user interface element 342.

In FIG. 3E, a final stage of removal of the particular user interface element 304 from the display area 315 is shown. After the particular user interface element 304 has been removed and transitions of other user interface elements are completed, the first row of the grid includes user interface elements 302, 306, and 312. The second row of the grid includes user interface elements 314, 316, and 322. The third row of the grid includes user interface elements 324, 326, and 332. The fourth row of the grid includes user interface elements 334, 336, and 342.

Figure 4A:
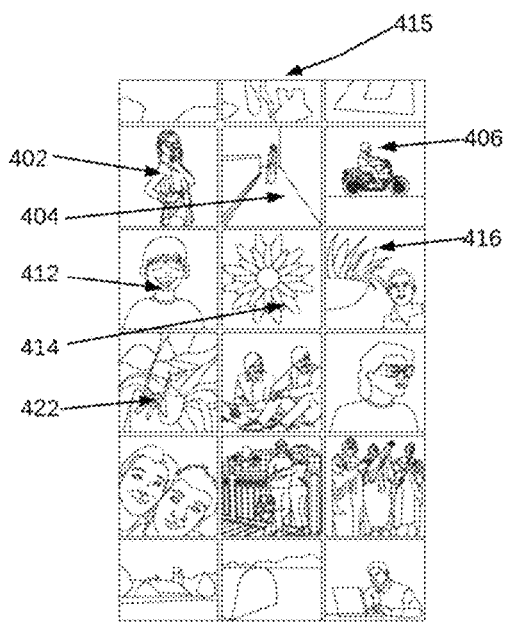
FIGS. 4A-4D are diagrammatic illustrations of stages in an example animation generated according to some implementations.
Figure 4B:
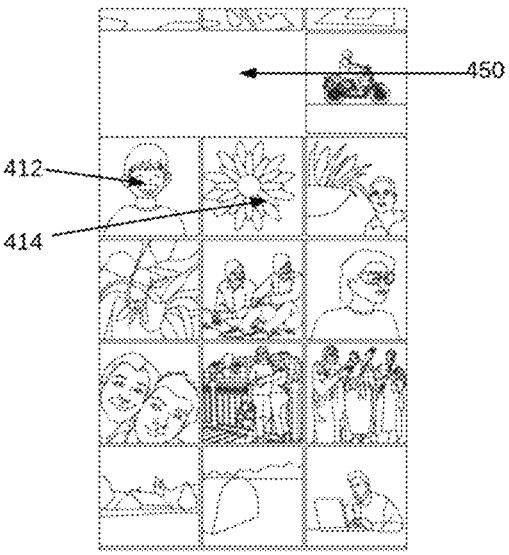
Figure 4C:
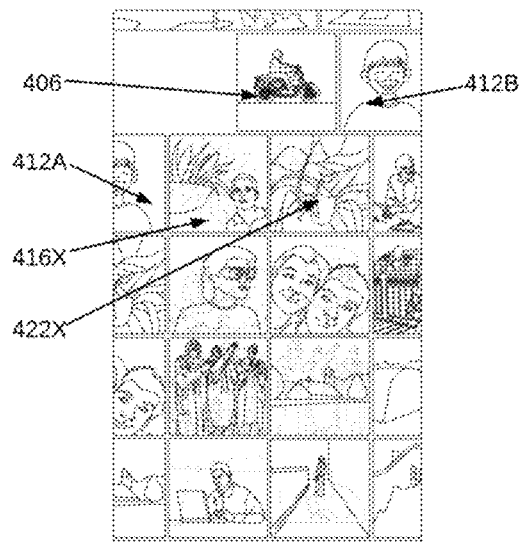

FIGS. 4A-4D are diagrammatic illustrations of stages in another example animation generated and displayed according to some implementations. In the example animation of FIGS. 4A-4D, the display direction is "left-to-right" and that the follow-on display direction is "top-to-bottom." Some reference numerals are omitted from FIGS. 4B-4D for clarity. FIG. 4A illustrates an initial user interface. In FIG. 4A, a display area 415 includes a grid of user interface elements, where the grid includes multiple rows. A first row includes user interface elements 402, 404, and 406. A second row includes user interface elements 412, 414, and 416. A third row includes user interface element 422 and two other user interface elements. Additional rows of user interface elements are also shown. In this example, input may be received to remove particular user interface elements 402 and 404 from the user interface.

FIG. 4B-4C each show an intermediate stage of an example animation of removal of the particular user interface elements 402 and 404. In FIG. 4B, a first stage of removal of the particular user interface elements 402 and 404 from the display area 415 is shown. FIG. 4B shows an intermediate stage of the animation in which the particular user interface elements 402 and 404 have been removed from the display area 415. Intermediate stages of removal of the particular user interface elements 402 and 404 may include effects similar to those described above with reference to user interface element 304 of FIG. 3. An empty slot 450 is shown in the position previously occupied by the particular user interface elements 402 and 404. In this example, the empty slot is about twice the width of a user interface element, since two particular user interface elements 402 and 404 were removed. In different implementations, the empty slot 450 may be considered to be two empty slots, and/or may be of different dimensions, e.g., a larger or smaller width. In some implementations, other objects, such as placeholder objects, objects of specific color or fill pattern etc., may be included instead of the empty slot, while the user interface animation is in progress.

In FIG. 4C, another intermediate stage of the animation is shown. As shown in FIG. 4C, user interface elements 406 and 412 that are adjacent to the particular user interface elements 402 and 404 that were removed, are shown transitioning into the empty slot to positions that were previously occupied by the removed particular user interface elements 402 and 404. As shown in FIG. 4C, the user interface element 406 is transitioned from the rightmost position in its row towards the leftmost position. Further, the user interface element 412 is transitioned outside the display area from the next row, where a first portion of the user interface element 412A is shown, and the user interface element 412 transitions into the display area into the current row, where a portion 412B of the user interface element 412 is displayed.

In some implementations, such as implementations in which the user interface elements are of an identical size, e.g., as shown in FIG. 1A, the number of adjacent user elements may be the same as the number of the particular user interface elements that are removed. In some implementations, such as implementations in which the user interface elements are of different size, e.g., as shown in FIG. 1B, the number of adjacent user interface elements may be less than or greater than the number of particular user interface elements that are removed. For example, when the adjacent user interface elements are smaller, e.g., have less width than the particular user interface elements that were removed, a number of adjacent user interface elements shown transitioning into the empty slot may be greater than the number of particular user interface elements that are removed. In another example, when the adjacent user interface elements are larger, e.g., have greater width than the particular user interface elements that were removed, a number of adjacent user interface elements shown transitioning into the empty slot may be lower than the number of particular user interface elements that were removed.

Figure 4D:
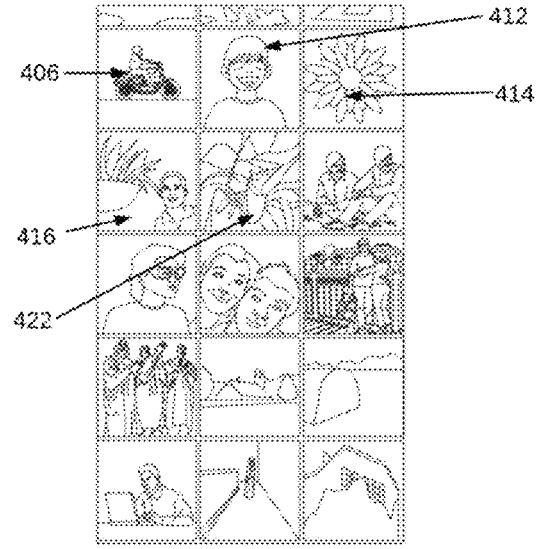

Continuing with FIG. 4C, certain user interface elements may be cross-faded with a next adjacent user interface element, as described above with reference to FIG. 2. For example, in some implementations, elements below the row having deletions that are moved more than one position can be cross-faded into their new positions. For example, in FIG. 4C, a user interface element 416X is seen, which illustrates cross-fading of the user interface element 414 into the next adjacent element 416 (that moves two positions as shown in FIG. 4D), and a user interface element 422X is seen, which illustrates cross-fading of the user interface element 416 with the next adjacent element 422 (that moves two positions as shown in FIG. 4D). In the cross-fading examples of FIG. 4C, the previous user interface element appearance is shown in faded grey lines.

In FIG. 4D, a final stage of removal of the particular user interface elements 402 and 404 from the display area 415 is illustrated. After the particular user interface elements 402 and 404 have been removed, and transitions of other user interface elements are completed, the first row of the grid includes user interface elements 406, 412, and 414. The second row of the grid includes user interface elements 416, 422, and subsequent user interface elements (not labeled).

FIGS. 4A-4D together also illustrate an example of transitions of various user interface elements such that a start time and/or an end time for the transitions are substantially the same for all of the user interface elements. In some examples, this allows all the elements moved in an animation to end up at their final positions at about the same time. For example, certain user interface elements may experience relatively greater motion over a greater number of positions or distances, e.g., 406 and 412 in FIG. 4, than other user interface elements, e.g., user interface elements 416 and 422. In this example, the user interface elements 406 and 412 may be transitioned (e.g., moved in animation) relatively faster than user interface elements 416 and 422, which may be cross-faded into a new position.

Figure 5:
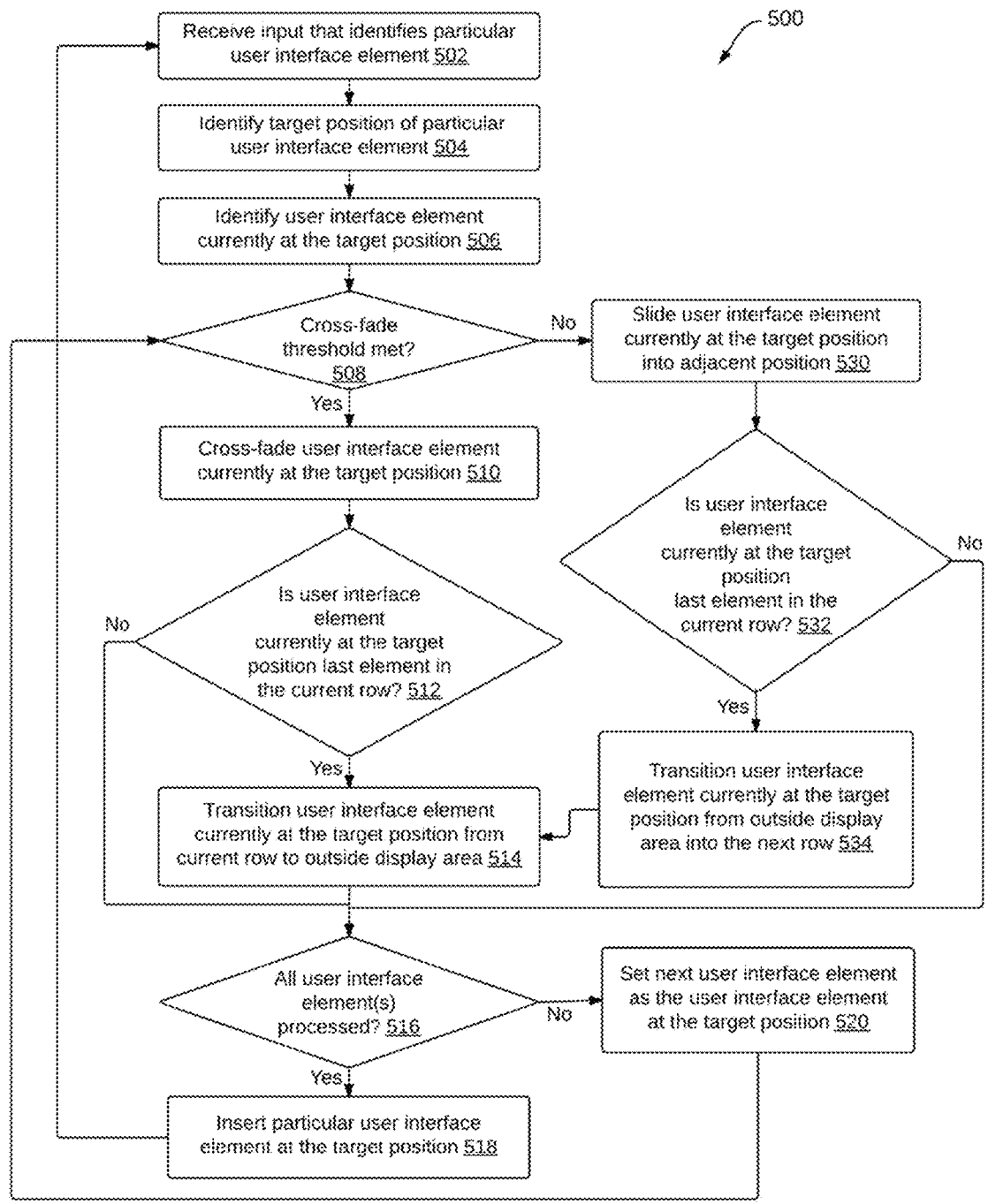
FIG. 5 is a flow diagram illustrating an example method to generate an animation indicating insertion of a user interface element, according to some implementations.

FIG. 5 is a flow diagram illustrating an example method 500 to generate an animation indicating addition of a user interface element, according to some implementations. In various implementations, some or all of the method 500 can be implemented on a client device, e.g., a smartphone or other phone, a tablet, a personal computer, a wearable device, etc., or on one or more server devices such as a web server, a cloud-based server etc., and/or on both server device(s) and client device(s). In described examples, the implementing system includes one or more digital processors or processing circuitry ("processors"), and one or more storage devices. In some implementations, different components of one or more servers and/or clients can perform different blocks or other parts of the method 500.

Some implementations can initiate method 500 based on user input. A user may, for example, have selected initiation of the method 500 from a displayed user interface. For example, the user may have provided input regarding manipulation of one or more user interface elements, e.g., user interface elements 110, 120, 130, and 140. In the description of method 500, it is assumed that the display direction is left-to-right and that the follow-on display direction is top-to-bottom, e.g., as shown in FIGS. 1A and 1B. Method 500 can also be applied to user interface element grids that utilize other display directions, e.g., the user interface element grids shown in FIGS. 1C and 1D.

In block 502, input that identifies a particular user interface element is received. In some implementations, the input may identify multiple particular user interface elements. For example, the user interface elements may be images or image thumbnails that represent one or more images. In this example, the input may be one or more images or image thumbnails that are to be added, e.g., added to a particular album or other collection, other set of images, or area of storage of a client device or a server device. In another example, the user interface elements may be icons that represent one or more software applications available to a user or one or more functions of a device or application selectable by a user. In this example, the input may be a selection of one or more icons that correspond to applications that are to be added, e.g., installed to storage of a client device or a server. In this example, icons for the applications that are added may be inserted in the grid of user interface elements. In another example, the display area may span only a portion of the available display, e.g., as shown in FIG. 1D. For example, the display area may represent a folder that includes one or more computer files. In this example, the input may be selection of one or more files to be added to the folder that is represented by the display area. In different examples, the input may be received directly from a user, e.g., via a touchscreen, a gesture recognition interface, a keyboard, a mouse, a microphone, a touchpad, or other input device. In some examples, e.g., when a software application is installed on a device, an interface element (e.g., icon) to be added is received in block 502 for display in a grid displayed on that device. The method continues to block 504.

In block 504, a target position is identified for the particular user interface element in the display area, e.g., display area 115, 125, 135, or 145. For example, the target position may be identified based on the input. If the input is from a user, e.g., a drag-and-drop action or identification of a particular position in the display area by other techniques such as selecting from available target positions, the target position may be specified in the input. In some implementations, the target position may be determined based on other criteria. For example, for files added to a folder, the target position for each file may be based on file metadata such as creation date, modified date, filename, file size, etc. and a sort order for the folder. The method continues to block 506.

In block 506, a user interface element that is currently at the target position is identified. In some implementations, the user interface element that corresponds to a position specified by the user input may be identified. In some implementations, the user interface element that has metadata closest to the particular user interface element may be identified. For example, if the user interface elements represent files in a folder, the user interface element that corresponds to a file that has a creation date, modified date, filename, file size, etc. closest to and greater than metadata of the particular user interface element may be identified when the sort order is ascending. The method continues to block 508.

In block 508, it is determined whether a cross-fade threshold is met. Selection of cross-fade threshold and determination of whether the cross-fade threshold is met may be performed in a manner similar to that described above with reference to FIG. 3. If the cross-fade threshold is met, block 510 may be performed. If the cross-fade threshold is not met, block 530 may be performed.

In block 510, a cross-fade effect is applied to the user interface element that is currently at the target position. For example, the cross-fade effect can change (e.g., replace) that user interface element to a different user interface element having an ending position at the target position without displaying individual animated movement of the different interface element across one or more positions of the grid. The cross-fade effect may be applied in a manner similar to that described above with reference to FIG. 3. The method continues to block 512.

In block 512, it is determined if the user interface element currently at the target position is the last element, e.g., the rightmost element, in the current row. If it determined that the user interface element currently at the target position is the last element in the current row, block 514 may be performed. If it determined that the user interface element currently at the target position is not the last element in the current row, block 516 may be performed.

In block 514, the user interface element currently at the target position is transitioned from its position in the current row to outside the display area. In some implementations, transitioning may involve generating one or more intermediate images, each including a portion of the user interface element currently at the target position. Each intermediate image may include progressively lesser portions of the user interface element currently in the target position. When the intermediate images are displayed in a sequence, the intermediate images may produce an effect of the user interface element currently in the target position moving, e.g., sliding, out from the rightmost position in the current row. The method continues to block 516.

In block 516, it is determined whether all user interface elements in the display area have been processed. If all user interface elements have been processed, block 518 may be performed. If all user interface elements have not been processed, block 520 may be performed.

In block 518, the particular user interface element is inserted at the target position. In some implementations, the particular user interface element may replace an empty slot at the target position, e.g., a slot left behind after the user interface element currently at the target position is transitioned. In some implementations, the one or more particular user interface elements may be inserted instantly, e.g., directly replace an empty grid position or space without use of any intermediate images.

In some implementations, an effect may be displayed as the one or more particular user interface elements are inserted into the grid of user interface elements in the display area. For example, the particular user interface element may be inserted via a sequence of intermediate images. For example, an initial intermediate image may be a thumbnail of the particular user interface element, and each subsequent intermediate image may be a larger thumbnail than a previous intermediate image. The final image may represent the particular interface element in the target position. When displayed in the sequence, the intermediate images may produce an effect of the particular user interface element growing in size in the target position. In different implementations, the thumbnails may be centered in the target position, or offset at any point with the target position. In some examples, the effect may be a progressive fade-in, e.g., by fading in colors of the user interface elements that are inserted, e.g., from white color, from grey color etc. In different implementations, various combinations of growing and fading may be used. Such effects may enable user perception of the user interface element having been added in the target position. FIG. 6 illustrates an example animation that shows insertion of a particular user interface element at a target position. The method continues to block 502 to receive input that identifies a particular user interface element, where further input indicative of insertion of particular user interface element(s) may be received.

In block 520, a next user interface element in the display direction may be set as the user interface element at the target position. For example, when the display direction is left-to-right and the follow-on display direction is top-to-bottom, the next user interface element may be a user interface element immediately to the right of the current user interface element at the target position, or a user interface element at the leftmost position in a row directly below the row of the current user interface element in the target position. The method continues to block 508 to determine whether a cross-fade threshold is met.

In block 530, which may be performed after block 508 if the cross-fade threshold is not met, the user interface element currently in the target position is slid into an adjacent position. For example, when the display direction is left-to-right and the follow-on display direction is top-to-bottom, the next position may be a position immediately to the right of the current user interface element at the target position, or a leftmost position in a row directly below the row of the current user interface element in the target position. The method continues to block 532.

In block 532, it is determined if the user interface element currently at the target position the last element in the current row. For example, when the display direction is left-to-right and the follow-on display direction is top-to-bottom, the user interface element currently at the target position may be the last element in the current row if it is the rightmost element in the current row. If it is determined that the user interface element currently at the target position is the last element in the current row, block 534 may be performed. If it is determined that the user interface element currently at the target position is not the last element in the current row, block 516 may be performed.

In block 534, the user interface element currently at the target position is transitioned from outside the display area into the next row. In some implementations, transitioning may involve generating one or more intermediate images, each including a portion of the user interface element currently at the target position. Each intermediate image may include progressively greater portions of the user interface element currently in the target position. When the intermediate images are displayed in a sequence, the intermediate images may produce an effect of the user interface element currently in the target position sliding in from outside the display area into the leftmost position in the next row. The method continues to block 514.

In some implementations, transitions of various user interface elements may be performed such that a start time and/or an end time for the transitions are substantially the same for all of the user interface elements, e.g., similarly as described above. In some implementations, transitioning an element may include adjusting a dimension of the row, e.g., similarly as described above.

While method 500 has been described with reference to various blocks in FIG. 5, it may be understood that techniques described herein for animation of user interface elements may be performed without performing some of the blocks of FIG. 5. For example, some implementations may not perform a check to determine if a cross-fade threshold is met. In these implementations, cross-fade may be omitted, or may be performed for all user interface elements that undergo a change in position. In some implementations, transition of adjacent elements and insertion of particular user interface elements (e.g., in the current row) may be performed in sequence. In some implementations, transition of adjacent elements and insertion of particular user interface elements in the current row may be performed at substantially (partially or completely) the same time.

In some implementations, additional blocks not shown in FIG. 5 may be additionally performed. For example, if the user input includes multiple particular user interface elements that are to be inserted in adjacent target positions such that the number of particular user interface elements is equal to or greater than the number of elements in a row, an entire row may be inserted. In this example, the user interface elements currently at the target positions for the row may be moved to a next row, without performing the transitions described in FIG. 5. Performing row insertion in this manner may enable a simpler animation.

In various implementations, the blocks described in FIG. 2 can be performed in a different order than shown and/or simultaneously (partially or completely) with other blocks, e.g., in parallel, where appropriate. Some blocks can be performed and later performed again, e.g., for a different element or data. In some implementations, blocks can be performed multiple times, in a different order, and/or at different times in the methods. In various implementations, some of the blocks may be combined. In some implementations, the methods can be implemented, for example, on a server system 102 as shown in FIG. 1. In some implementations, one or more client devices can perform one or more blocks instead of or in addition to a server system performing those blocks.

Figure 6A:
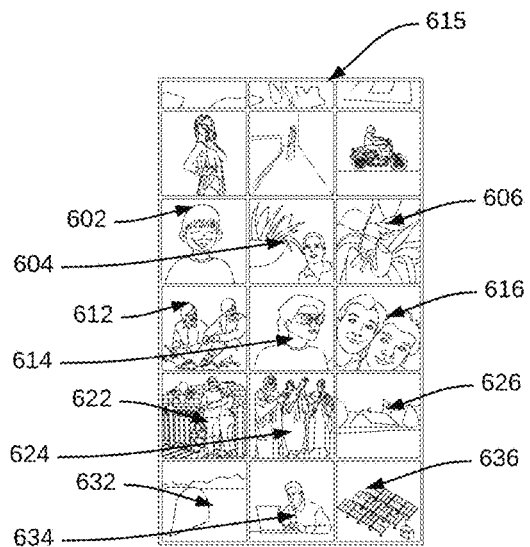
FIGS. 6A-6D are diagrammatic illustrations of stages in an example animation generated according to some implementations.

FIGS. 6A-6D are diagrammatic illustrations of stages in an example animation generated and displayed according to some implementations. In the example animation of FIGS. 6A-6D, the display direction is "left-to-right" and the follow-on display direction is "top-to-bottom." Some reference numerals are omitted from FIGS. 6B-6D for clarity. FIG. 6A illustrates an initial user interface. In FIG. 6A, a display area 615 includes a grid of user interface elements. The grid includes multiple rows. A first row includes user interface elements 602, 604, and 606. A second row includes user interface elements 612, 614, and 616. A third row includes user interface elements 622, 624, and 626. A fourth row includes user interface elements 632, 634, and 636. As shown in FIG. 6A, there may be additional rows in the grid in the user interface that are static, e.g., are not a part of the animation. For example, the row which includes three user interface elements that are shown directly above respective user interface elements 602, 604, and 606 is not part of the animation illustrated in the example of FIGS. 6A-6D.

Figure 6B:
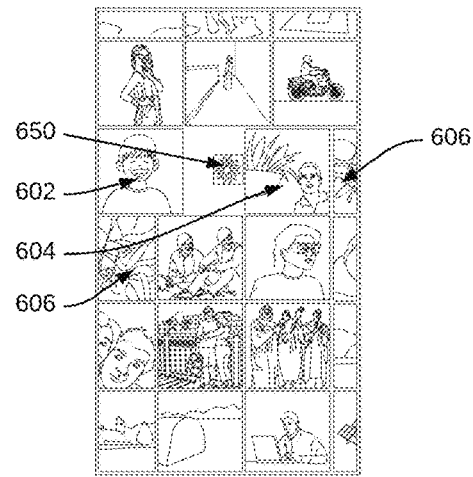

FIG. 6B shows an intermediate stage of an example animation of addition (e.g., insertion) of a particular user interface element 650. The user interface element 650 may be received as input, as described above with reference to FIG. 5. The input may indicate a target position for the user interface element 650, e.g., between the user interface elements 602 and 604. As shown in FIG. 6B, the user interface element 604 may be transitioned, e.g., moved to the right, to provide empty space for the particular user interface element 650. As shown in FIG. 6B, the user interface element 650 may be transitioned into the target position, as the user interface elements 602 and 604 are undergoing transition. Other user interface elements that are in the grid after the user interface element 604, e.g., user interface element 606, are also shown in transition in FIG. 6B.

Figure 6C:
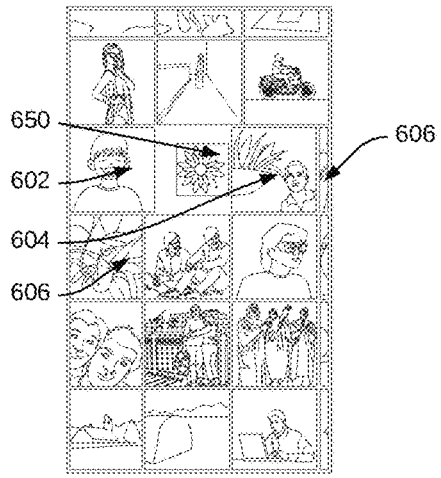

FIG. 6C shows another intermediate stage of an example animation of addition of the particular user interface element 650, that may be a later stage than the stage shown in FIG. 6B. As shown in FIG. 6C, the particular user interface element 650 is of larger size than shown in FIG. 6B, indicative of a growth in size of the particular user interface element 650 as the animation progresses. In some implementations, the animation may show the insertion of the particular user interface element 650 in other ways. For example, only the borders of the element 650 can be increased in size while the content within the borders is maintained at a constant size and is cropped to the current size of the borders. In other examples, the particular user interface element 650 can be faded in, or other suitable changes can be made to the particular user element 650. Different combinations of changes to the particular user interface element 650 may also be used.

Figure 6D:
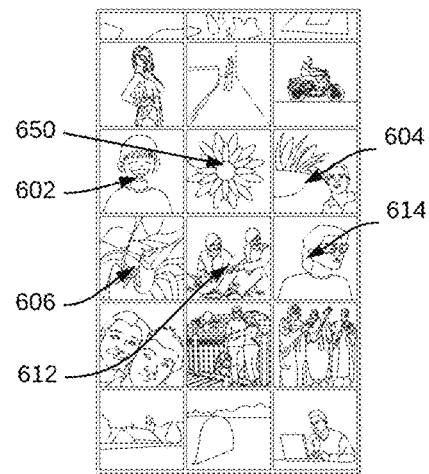

In FIG. 6D, a final stage is shown of insertion of the particular user interface element 650 into the grid of user interface elements in the display area 615. After the particular user interface element 650 has been inserted and transitions of other user interface elements are completed, the first row of the grid includes user interface elements 602, 650, and 604. The second row of the grid includes user interface elements 606, 612, and 614. The further rows also include user interface elements at respective positions after the transitions are completed (not labeled).

Figure 7A:
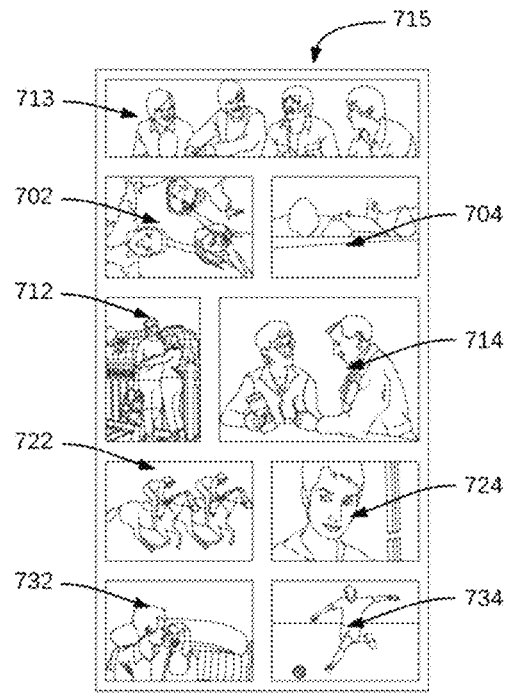
FIGS. 7A-7D are diagrammatic illustrations of stages in an example animation generated according to some implementations.

FIGS. 7A-7D are diagrammatic illustrations of stages in an example animation generated according to some implementations. In the example animation of FIGS. 7A-7D, the display direction is "left-to-right" and the follow-on display direction is "top-to-bottom." Some reference numerals are omitted from FIGS. 7B-7D for clarity. FIG. 7A illustrates an initial user interface. In FIG. 7A, a display area 715 includes a grid of user interface elements. The grid includes multiple rows. A first row includes user interface elements 702 and 704. A second row includes user interface elements 712 and 714. A third row includes user interface elements 722 and 724. A fourth row includes user interface elements 732 and 734. As shown in FIG. 7A, there may be additional rows in the grid in the user interface that are static, e.g., are not a part of the animation. For example, row 713 which includes a user interface element that is shown directly above respective user interface elements 702 and 704 is not part of the animation illustrated in FIGS. 7A-7D.

User interface elements in FIG. 7A have different sizes. For example, user interface element 713 has a larger width than other user interface elements and spans substantially the entire display area. Further, user interface elements 702 and 704 are rectangular in shape and have a larger width than height, indicative of a landscape orientation. Further, user interface element 712 is rectangular in shape and has a larger height than width, indicative of a portrait orientation. In different user interface element grids, user interface elements may have different sizes, shapes, and orientations, e.g., as shown in FIGS. 1A-1D.

Figure 7B:
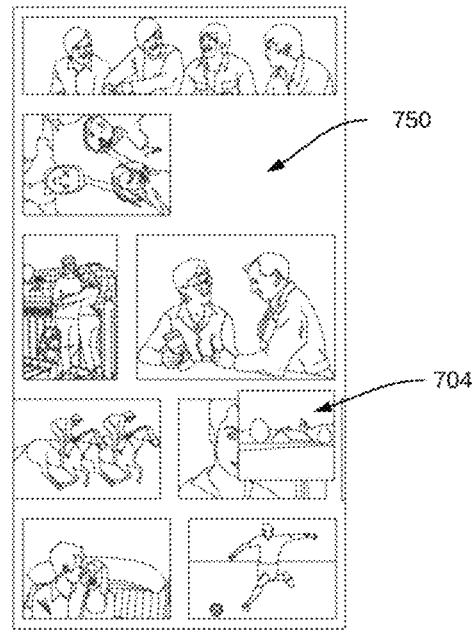

FIG. 7B shows an intermediate stage of an example animation of movement of a particular user interface element 704 within the grid of user interface elements. The user interface element 704 may be received as input, as described above with reference to FIGS. 3 and 5. The input may indicate a target position for the user interface element 750, e.g., between the user interface elements 724 and 732. As shown in FIG. 7B, the user interface element 704 may be moved to the target position (e.g., animated motion or otherwise), which may result in empty slot 750 at the previous position of the particular user interface element 704.

Figure 7C:
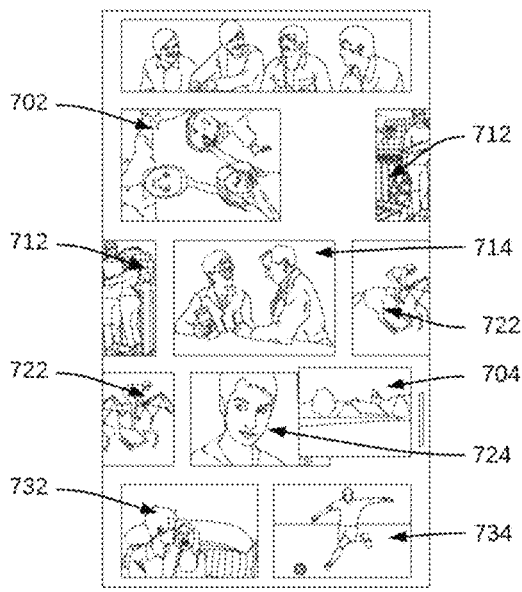
Figure 7D:
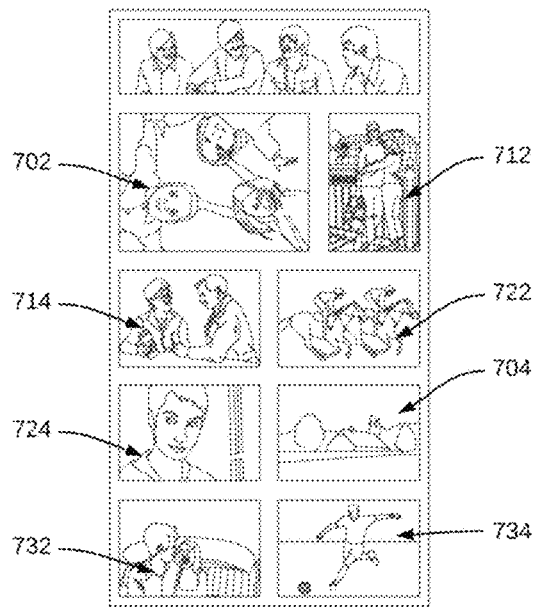

As shown in FIGS. 7C-7D, the user interface element 704 may be moved to the target position, as the user interface elements, such as user interface elements 702 and 712 are undergoing transition. Other user interface elements that are in the grid are also shown in transition in FIG. 7C-7D.

FIG. 7C shows another intermediate stage of an example animation of moving of the particular user interface element 704, that may be a later stage than the stage shown in FIG. 7B. As shown in FIG. 7C, as the particular user interface element 704 is moved to the target position, user interface element 712 is transitioned into the empty slot 750. In the example shown in FIG. 7C, the user interface element is of a different size (e.g., of a greater height, portrait orientation, etc.) than the user interface element 704. Accordingly, a dimension of the row that the user interface element 712 transitions into is increased. As shown in FIG. 7C, a height of the row is increased, such that the user interface element 702 increases in height as the user interface element transitions in. Correspondingly, the height of the row in which the user interface element 712 was previously located is reduced. In this example, interface element 702 retains its aspect ratio as it increases in height such that its width is correspondingly increased.

FIG. 7D shows a final stage of an example animation of moving of the particular user interface element 704. As shown in FIG. 7D, user interface elements 702 and 712 are adjacent in the first row of the grid of user interface elements. The first row in FIG. 7D has a greater height than the first row in FIG. 7A, e.g., to adjust for the size of the user interface element 712. User interface elements 714 and 722 are adjacent in the first row of the grid of user interface elements. The second row in FIG. 7D has less height than the second row in FIG. 7A, e.g., since the user interface element 712 that is in portrait orientation has transitioned out of the second row. User interface elements 724 and 704 are adjacent in the third row of the grid of user interface elements, after completion of movement of the user interface element 704. In some implementations, if one row is increased in height (e.g., as shown for the first row of display area 715), one or more other rows are decreased in height correspondingly to maintain a constant overall height dimension for the display area 715. A single row can be decreased in height as shown in FIGS. 7A-7D, or multiple rows can be decreased in height in some implementations.

Figure 8:
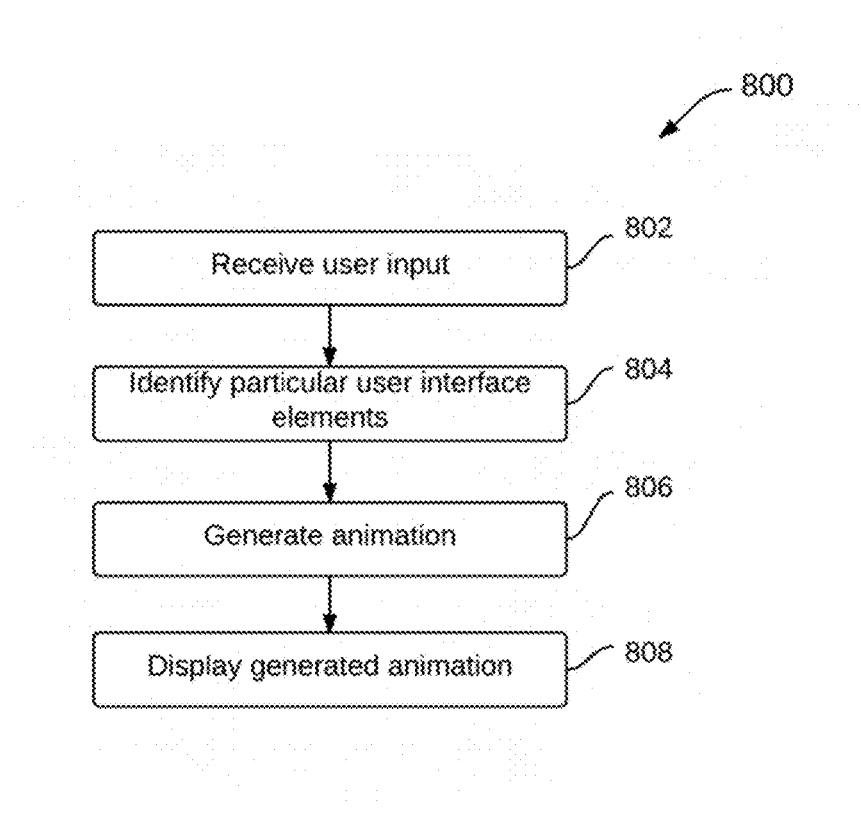
FIG. 8 is a flow diagram illustrating an example method to provide an animation in a user interface with user interface elements arranged in a grid, according to some implementations.

FIG. 8 is a flow diagram illustrating an example method 800 to provide an animation in a user interface with user interface elements arranged in a grid, according to some implementations.

In block 802, user input is received. For example, the user input may be indicative of removal of one or more user interface elements from a grid of user interface elements in a display area. In another example, the user input may be indicative of insertion of one or more user interface elements into a grid of user interface elements in a display area. In yet another example, the user input may be indicative of removal of first one or more user interface elements and insertion of second one or more user interface elements into a grid of user interface elements in a display area. In yet another example, the user input may be indicative of moving of one or more particular user interface elements from a first position to a second position in a grid of user interface elements in a display area.

In different examples, the user input may be received directly from a user, e.g., via a touchscreen, a gesture recognition interface, a keyboard, a mouse, a microphone, a touchpad, or other input device. For example, a user may provide input by touching one or more of the particular user interface elements in the display area when the grid of user interface elements is displayed on a touchscreen, e.g., a display combined with a touch interface. In some examples, a user may view the display area with a wearable device such as an augmented reality headset, a head-mounted display, a hand-worn device such as a smartwatch, etc. In these examples, user input may be received via gestures, e.g., performed by the user with their limbs, head, fingers, etc. In some examples, the gestures may include pointing gestures that identify one or more elements for removal, drag-and-drop gestures that indicate insertion of one or more elements into the grid, and the like. In some examples, the user may view the display area on a display integrated with a computing device such as a personal computer, a tablet, etc. In these examples, user input may be received via a keyboard, a mouse, or other interface device. In further examples, user input may be received via voice, e.g., a user may speak a phrase such as "remove the third photo on the second row" as received by microphone(s) of a user device. The method continues to block 804.

In block 804, one or more particular user interface elements may be identified based on the user input. For example, the one or more particular user interface elements that the user touched, pointed to, or otherwise selected may be elements that are identified for removal, insertion, or moving to a different position in the grid of user interface elements. The method continues to block 806.

In block 806, an animation is generated. In various examples, the animation may be generated using methods described above with reference to FIGS. 3 and 5. In some examples, e.g., when first particular user interface elements are indicated for addition and second particular user interface elements are indicated for removal, or when one or more particular user interface elements are moved, a combination of the methods described in FIGS. 3 and 5 may be used to generate the animation. The method continues to block 808.

In block 808, the animation is caused to be displayed. In various examples, the animation may be displayed on a display integrated with a user device, a display coupled to the user device, etc. For example, if the user input is received via a touchscreen, the animation may be displayed on the touchscreen. In another example, if the user input is received via gestures, the animation may be displayed on a wearable device such as an augmented reality headset. In displaying the animation, one or more images, such as those in FIGS. 3, 4, 6, and 7, may be rendered on the display in a sequence. In various examples, the images may be rendered within a particular amount of time. In some implementations, the total time available for display of the animation may be a predetermined amount of time. In some examples, the predetermined amount of time may be specified, e.g., by a software application or an operating system of a user device, that displays the animation. In some implementations, the total time available for the animation may be allocated to images from various stages of the animation such that the animation is easily comprehensible to the user. In one example, different stages of the animation may be allocated an equal amount of the total available time. In another example, images from an end stage of the animation may be allocated relatively more time in the animation than images from earlier stages. In some implementations, the total time available for display of the animation may be based on a total number of particular user interface elements that are manipulated, e.g., inserted, removed, moved etc. For example, a greater total time may be provided for the animation of a larger number of manipulated user interface elements than of a smaller number of manipulated user elements.

Figure 9:
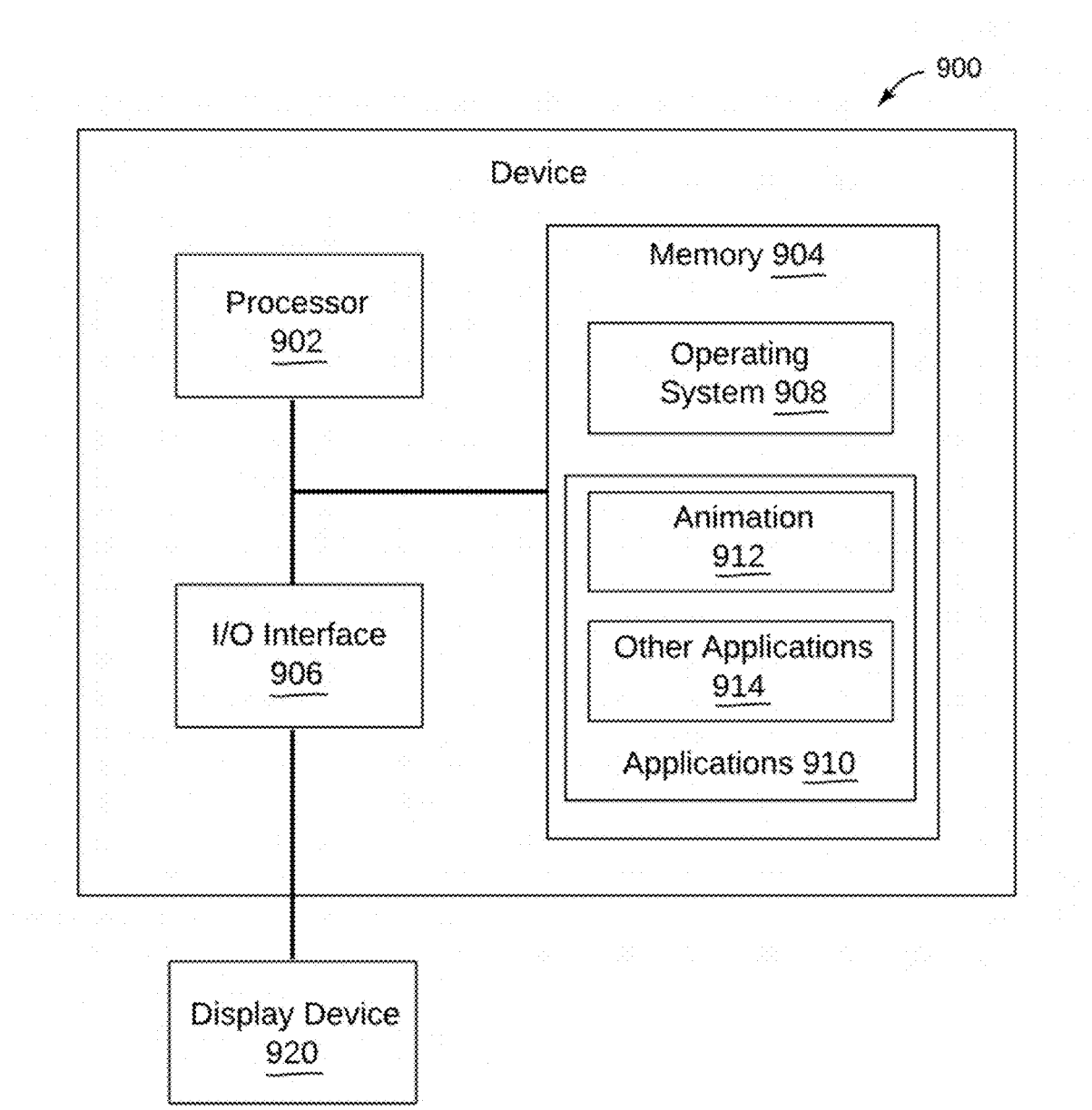
FIG. 9 is a block diagram of an example device which may be used for one or more implementations described herein.

FIG. 9 is a block diagram of an example device 900 which may be used to implement one or more features described herein. In one example, device 900 may be used to implement computer device used to implement a server device and perform appropriate method implementations described herein or portions thereof. Device 900 can be any suitable computer system, server, or other electronic or hardware device. For example, the device 900 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 900 includes a processor 902, a memory 904, and input/output (I/O) interface 906.

Processor 902 can be one or more processors and/or processing circuits to execute program code and control basic operations of the device 900. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 904 is typically provided in device 900 for access by the processor 902, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 902 and/or integrated therewith. Memory 904 can store software operating on the server device 900 by the processor 902, including an operating system 908 and one or more applications 910, e.g., a graphics editing engine, web hosting engine, social networking engine, etc. In some implementations, applications 910 can include instructions that enable processor 902 to perform the functions described herein, e.g., some or all of the methods of FIGS. 2, 5, and 8. For example, applications 910 can include one or more animation display applications 912, which can determine animations, transitions, and other display effects of user interface elements as described herein. In some implementations, the animation display applications can provide (and/or can interface with program(s) that provide) a user interface that displays user interface elements, receives user input to manipulate user interface elements and indicate target positions, etc. The user interface can provide output data causing display of user interface elements on a display device 920 of the device 900. Other applications or engines 914 can also or alternatively be included in applications 910. For example, an image display program can cause display of selectable options/controls, images based on selected options, videos, etc. Other applications 914 can include image editing applications, media display applications, communication applications, web hosting engine or application, social networking engine or application, etc. Any of software in memory 904 can alternatively be stored on any other suitable storage location or computer-readable medium. In addition, memory 904 (and/or other connected storage device(s)) can store images, icons, grid layouts, intermediate images used in animations and other displayed effects, user interface elements, user preferences, system settings, and other instructions and data used in the features described herein. Memory 904 and any other type of storage (magnetic disk, optical disk, magnetic tape, or other tangible media) can be considered "storage" or "storage devices."

I/O interface 906 can provide functions to enable interfacing the server device 900 with other systems and devices. For example, network communication devices, storage devices (e.g., memory and/or database 106), and input/output devices can communicate via interface 906. In some implementations, the I/O interface can connect to interface devices including input devices (keyboard, pointing device, touchscreen, microphone, camera, scanner, etc.) and/or output devices (display device, speaker devices, printer, motor, etc.). Display device 920 is one example of an output device that can be used to display content, e.g., one or more images provided in an image display interface or other output application as described herein. Display device 920 can be connected to device 900 via local connections (e.g., display bus) and/or via networked connections and can be any suitable display device, some examples of which are described below.

For ease of illustration, FIG. 9 shows one block for each of processor 902, memory 904, I/O interface 906, and software blocks 908 and 910. These blocks may represent one or more processors or processing circuitries, operating systems, memories, I/O interfaces, applications, and/or software modules. In other implementations, device 900 may not have all of the components shown and/or may have other elements including other types of elements instead of, or in addition to, those shown herein. While server system 102 is described as performing operations as described in some implementations herein, any suitable component or combination of components of system 102 or similar system, or any suitable processor or processors associated with such a system, may perform the operations described.

A client device can also implement and/or be used with features described herein. One or more client devices, for example, can be connected to one or more networks and one or more server devices can be connected to the one or more networks, allowing communication between client devices and server devices and communication between client devices (e.g., via one or more server devices or directly between client devices). Example client devices can be computer devices including some similar components as the device 900, e.g., processor(s) 902, memory 904, and I/O interface 906. An operating system, software and applications suitable for the client device can be provided in memory and used by the processor, e.g., user interface, animation, and image display software, client group communication application software, etc. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device 920, for example, can be connected to (or included in) the device 900 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more techniques and methods described herein (e.g., methods of FIGS. 2, 5, and 8) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

The systems and methods discussed herein do not require collection or usage of user personal information. In situations in which certain implementations discussed herein may collect or use personal information about users (e.g., user data, information about a user's social network, user's location, user's biometric information, user's activities and demographic information), users are provided with one or more opportunities to control whether the personal information is collected, whether the personal information is stored, whether the personal information is used, and how the information is collected about the user, stored and used. That is, the systems and methods discussed herein collect, store and/or use user personal information only upon receiving explicit authorization from the relevant users to do so. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method comprising:
   receiving user input indicative of manipulation of at least one particular user interface element with respect to a grid including a plurality of user interface elements arranged in a display area;
   identifying, based on the user input, at least a first row and a second row of the grid to be updated;
   generating an animation to update the grid, wherein the animation comprises:
      one or more transitions comprising at least one of:
         transition of a first user interface element from the first row to outside the display area along a first direction; or
         transition of a second user interface element into the first row from outside the display area along a second direction, the second direction different from the first direction; and
      update of the second row of the grid,
      wherein in response to a cross-fade threshold being met, the update of the second row of the grid comprises a cross-fade transition of one or more user interface elements in the second row to one or more other user interface elements of the grid without displaying motion of the one or more other user interface elements across positions of the grid,
      wherein the cross-fade threshold is met when at least a threshold number of particular user interface elements which are removed or added in the manipulation of the at least one particular user interface element are positioned in the grid before the one or more user interface elements in the second row; and
   causing the animation to be displayed.

2. The method of claim 1, wherein the at least one particular user interface element is included in the grid, and wherein receiving user input comprises receiving indication to remove the at least one particular user interface element from the grid.

3. The method of claim 1, wherein the at least one particular user interface element is in the first row, and wherein receiving user input comprises receiving indication to remove the at least one particular user interface element from the grid,
   wherein generating the animation further comprises removing the at least one particular user interface element from the first row of the grid.

4. The method of claim 1, wherein the at least one particular user interface element is from a row of the grid different from the first row, and wherein receiving user input comprises receiving indication to move the at least one particular user interface element to the first row of the grid.

5. The method of claim 1, wherein the at least one particular user interface element is not part of the grid, and wherein receiving user input comprises receiving indication to insert the at least one particular user interface element into the grid.

6. The method of claim 1, wherein the at least one particular user interface element is not part of the grid, and wherein receiving user input comprises receiving indication to insert the at least one particular user interface element into the first row.

7. The method of claim 1, wherein generating the animation further comprises adjusting a dimension of the first row based on a size of at least one of: the first user interface element and the second user interface element.

8. The method of claim 1, further comprising:
determining a display direction for the display area; and
based on the display direction, selecting at least one of the first direction and the second direction.

9. The method of claim 8, wherein the display direction is a left-to-right direction, the first direction is the left-to-right direction, and the second direction is a right-to-left direction.

10. The method of claim 1, wherein the first row and the second row are adjacent in the grid, and wherein in response to the cross-fade threshold not being met, the update of the second row of the grid comprises at least one of:
transition of the first user interface element from outside the display area into the second row along the first direction, or
transition of the second user interface element from the second row to outside the display area along the second direction.

11. The method of claim 1, wherein the cross-fade threshold is met when the at least a threshold number of the particular user interface elements are positioned in the grid before the one or more user interface elements in the second row and when the one or more user interface elements in the second row are in a different row than the at least one particular user interface element.

12. The method of claim 1, further comprising identifying a third row of the grid for updates, and wherein generating the animation further comprises update of the third row of the grid.

13. The method of claim 1, wherein grid represents at least a portion of a photo album and the plurality of user interface elements in the grid are images or image thumbnails, wherein the user input instructs the particular user interface element to be added to or removed from the photo album.

14. A non-transitory computer readable medium having stored thereon software instructions that, when executed by a processor, cause the processor to perform operations including:
receiving user input indicative of manipulation of at least one particular user interface element with respect to a grid including a plurality of user interface elements arranged in a display area;
identifying, based on the user input, at least a first row and a second row of the grid to be updated;
generating an animation to update the grid, wherein the animation comprises:
transition of a first user interface element from the first row to outside the display area along a first direction; or
transition of a second user interface element into the first row from outside the display area along a second direction, the second direction different from the first direction; and
update of the second row of the grid,
wherein in response to a cross-fade threshold being met, the update of the second row of the grid comprises a cross-fade transition of one or more user interface elements in the second row to one or more other user interface elements of the grid without displaying motion of the one or more other user elements across positions of the grid,
wherein the cross-fade threshold is met when at least a threshold number of particular user interface elements which are removed or added in the manipulation of the at least one particular user interface element are positioned in the grid before the one or more user interface elements in the second row; and
causing the animation to be displayed.

15. The computer readable medium of claim 14, wherein the at least one particular user interface element is included in the grid, wherein the operation of receiving user input comprises receiving indication to remove the at least one particular user interface element from the grid.

16. The computer readable medium of claim 14, wherein the at least one particular user interface element is not part of the grid, wherein the operation of receiving user input comprises receiving indication to insert the at least one particular user interface element into the grid.

17. A system comprising:
a storage device; and
at least one processor configured to access the storage device and configured to perform operations comprising:
receiving user input indicative of manipulation of at least one particular user interface element;
identifying, based on the user input, at least a first row and a second row of a grid to be updated based on the manipulation of the at least one particular user interface element, wherein the grid comprises a plurality of user interface elements arranged in a display area;
generating an animation to update the grid, wherein the animation comprises:
one or more transitions comprising at least one of:
transition of a first user interface element from the first row to outside the display area along a first direction; or
transition of a second user interface element into the first row from outside the display area along a second direction, the second direction opposite to the first direction; and
update of the second row of the grid,
wherein in response to a cross-fade threshold being met, the update of the second row of the grid comprises a cross-fade transition of one or more user interface elements in the second row to one or more other user interface elements of the grid without displaying motion of the one or more other user elements across positions of the grid,
wherein the cross-fade threshold is met when at least a threshold number of particular user interface elements which are removed or added in the manipulation of the at least one particular user interface element are positioned in the grid before the one or more user interface elements in the second row; and
causing the animation to be displayed.

18. The system of claim 17 wherein the manipulation includes one of:
insertion of the at least one particular user interface element into the grid,
removal of the at least one particular interface element from the grid, or movement of the at least one particular user interface element from a first position in the grid to a second position in the grid.

19. The system of claim 17, wherein the first row and the second row are adjacent in the grid, and wherein in response to the cross-fade threshold not being met, the operation including update of the second row of the grid comprises at least one of:
   transition of the first user interface element from outside the display area into the second row along the first direction, and
   transition of the second user interface element from the second row to outside the display area along the second direction.

20. The system of claim 17 wherein the cross-fade threshold is met when the at least a threshold number of the particular user interface elements are positioned in the grid before the one or more user interface elements in the second row and when the one or more user interface elements in the second row are in a different row than the at least one particular user interface element.

* * * * *